(12) United States Patent
Yang et al.

(10) Patent No.: US 12,451,956 B2
(45) Date of Patent: Oct. 21, 2025

(54) MULTIPLE DONOR SUPPORTED DIRECTIONAL REPEATER

(71) Applicant: NOKIA SOLUTIONS AND NETWORKS OY, Espoo (FI)

(72) Inventors: Roy Yang, Buffalo Grove, IL (US); Axel Mueller, Paris (FR); Kevin Wanuga, Souderton, PA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 27 days.

(21) Appl. No.: 17/502,955

(22) Filed: Oct. 15, 2021

(65) Prior Publication Data
US 2023/0119096 A1 Apr. 20, 2023

(51) Int. Cl.
H04B 7/155 (2006.01)
H04W 72/543 (2023.01)

(52) U.S. Cl.
CPC ...... H04B 7/15507 (2013.01); H04W 72/543 (2023.01)

(58) Field of Classification Search
None
See application file for complete search history.

(56) References Cited

U.S. PATENT DOCUMENTS

| | | | |
|---|---|---|---|
| 7,480,486 B1 * | 1/2009 | Oh | H04B 7/1555 455/13.1 |
| 8,068,448 B1 * | 11/2011 | Foley | H04B 7/18515 455/12.1 |
| 8,914,030 B2 * | 12/2014 | Nilsson | H04W 36/18 455/442 |
| 10,879,994 B2 | 12/2020 | Tarighat Mehrabani | |
| 11,375,527 B1 * | 6/2022 | Eyuboglu | H04B 7/15528 |
| 2008/0089394 A1 * | 4/2008 | Poberezhskiy | H04W 56/0085 375/145 |

(Continued)

FOREIGN PATENT DOCUMENTS

| | | | | |
|---|---|---|---|---|
| EP | 2802089 A1 * | 11/2014 | | H04B 7/1555 |
| WO | WO-2010083660 A1 * | 7/2010 | | H04W 16/04 |

OTHER PUBLICATIONS

"3rd Generation Partnership Project; Technical Specification Group Radio Access Network; Evolved Universal Terrestrial Radio Access (E-UTRA); FDD Repeater radio transmission and reception (Release 16)", 3GPP TS 36.106 v16.0.0, (Jun. 2020), 54 pages.

(Continued)

*Primary Examiner* — Wutchung Chu
*Assistant Examiner* — Berhanu D Belete
(74) *Attorney, Agent, or Firm* — ALSTON & BIRD LLP

(57) ABSTRACT

Techniques for providing a multiple donor supported repeater within a communication network are disclosed. An example of such techniques includes an apparatus which establishes a control channel with a respective donor node of one or more donor nodes. The apparatus receives an indication of resource information from the one or more donor nodes via the corresponding control channel. The apparatus determines a grid of physical repeater beam channels to cover an access area based at least in part on the received indication of resource information from the one or more donor nodes. Corresponding methods and computer program products are also provided.

23 Claims, 16 Drawing Sheets

(56) References Cited

U.S. PATENT DOCUMENTS

| | | | |
|---|---|---|---|
| 2008/0225931 A1* | 9/2008 | Proctor | H04B 7/15585 455/24 |
| 2009/0003477 A1* | 1/2009 | Nishio | H04L 5/0053 375/260 |
| 2010/0226323 A1* | 9/2010 | Kim | H04W 72/563 370/329 |
| 2010/0284446 A1* | 11/2010 | Mu | H04B 7/15521 375/211 |
| 2011/0235569 A1* | 9/2011 | Huang | H04W 28/02 370/315 |
| 2011/0235603 A1* | 9/2011 | Cheng | H04L 5/0035 370/329 |
| 2011/0242970 A1* | 10/2011 | Prakash | H04W 76/38 370/216 |
| 2012/0050834 A1* | 3/2012 | Harrison | H04B 10/70 359/107 |
| 2013/0040558 A1* | 2/2013 | Kazmi | H04B 7/15507 455/7 |
| 2013/0064172 A1* | 3/2013 | Park | H04W 72/21 370/315 |
| 2013/0177062 A1* | 7/2013 | Hori | H04B 1/0475 375/296 |
| 2013/0242905 A1* | 9/2013 | Rasband | H04W 74/0816 370/329 |
| 2015/0311967 A1* | 10/2015 | Boudreau | H04W 16/28 455/7 |
| 2015/0348450 A1* | 12/2015 | Park | G09F 3/208 340/5.91 |
| 2016/0135239 A1* | 5/2016 | Khoryaev | H04W 72/23 370/329 |
| 2016/0294462 A1* | 10/2016 | Jeong | H04B 7/0695 |
| 2017/0027013 A1* | 1/2017 | Kim | H04W 52/383 |
| 2017/0171845 A1* | 6/2017 | Seo | H04L 5/0053 |
| 2017/0290037 A1* | 10/2017 | Goel | H04W 72/56 |
| 2017/0303215 A1* | 10/2017 | Kim | H04W 52/48 |
| 2018/0310283 A1* | 10/2018 | Deenoo | H04W 72/046 |
| 2019/0037555 A1* | 1/2019 | Kim | H04W 72/23 |
| 2020/0280365 A1* | 9/2020 | Abedini | H04W 72/542 |
| 2020/0322037 A1 | 10/2020 | Abedini et al. | |
| 2020/0366363 A1* | 11/2020 | Li | H04L 5/003 |
| 2021/0036762 A1 | 2/2021 | Abedini et al. | |
| 2021/0037522 A1 | 2/2021 | Li et al. | |
| 2021/0067237 A1* | 3/2021 | Sampath | H04B 7/088 |
| 2021/0185588 A1 | 6/2021 | Ray Chaudhuri et al. | |
| 2021/0235283 A1* | 7/2021 | Abedini | H04W 74/0833 |
| 2021/0235501 A1* | 7/2021 | Abedini | H04B 7/155 |
| 2022/0182130 A1* | 6/2022 | Abedini | H04W 76/15 |
| 2022/0240305 A1* | 7/2022 | Black | H04B 7/155 |
| 2022/0337309 A1* | 10/2022 | Abedini | H04B 7/15528 |

OTHER PUBLICATIONS

"3rd Generation Partnership Project; Technical Specification Group Radio Access Network; NR; Backhaul Adaptation Protocol (BAP) specification (Release 16)", 3GPP TS 38.340 v16.5.0, (Jun. 2021), 22 pages.

"3rd Generation Partnership Project; Technical Specification Group Radio Access Network; NR; Multiplexing and channel coding (Release 16)", 3GPP TS 38.212 v16.7.0, (Sep. 2021), 153 pages.

"3rd Generation Partnership Project; Technical Specification Group Radio Access Network; NR; NR Repeater Radio Transmission and Reception (Release 17)", 3GPP TS 38.106 v0.0.1, (Apr. 2021), 13 pages.

"3rd Generation Partnership Project; Technical Specification Group Radio Access Network; NR; Physical channels and modulation (Release 16)" 3GPP TS 38.211 v16.7.0, (Sep. 2021), 134 pages.

"3rd Generation Partnership Project; Technical Specification Group Radio Access Network; NR; Physical layer procedures for control (Release 16)", 3GPP TS 38.213 v16.7.0, (Sep. 2021), 188 pages.

"3rd Generation Partnership Project; Technical Specification Group Radio Access Network; NR; Radio Resource Control (RRC) protocol specification (Release 16)", 3GPP TS 38.331 v16.6.0, (Sep. 2021), 966 pages.

Ibrahim et al., "Beam Selection for Ultra-Reliable Low-Latency Communication in Industrial Environment with Beamforming Repeaters", 2021 IEEE International Conference on Communications Workshops (ICC Workshops), Jun. 14-23, 2021, 6 pages.

Qualcomm, "New WID on NR Repeaters", 3GPP TSG RAN Meeting #91e, RP-210818, (Mar. 16-26, 2021), 3 pages.

Qualcomm, "NR Smart Repeaters for Rel-18", 3GPP TSG RAN Rel-18 Workshop, RWS-210019, (Jun. 28-Jul. 2, 2021), 14 pages.

Rakuten Mobile, "IAB and Smart Repeater Enhancements in Rel-18", 3GPP TSG RAN Rel-18 Workshop, RWS-210248, (Jun. 28-Jul. 2, 2021), 3 pages.

* cited by examiner

1600

Establish one or more communication channels with one or more apparatuses associated with the repeater node
1601

Determine resource allocation based at least in part on an indication of resource allocation availability from one or more other apparatuses
1602

Provide an indication of resource information to the repeater node
1603

MULTIPLE DONOR SUPPORTED DIRECTIONAL REPEATER

TECHNOLOGICAL FIELD

An example embodiment relates generally to wireless communications and, more particularly, but not exclusively, to the use of directional repeaters within communication networks.

BACKGROUND

Next generation or fifth generation (5G) technology was designed to provide high capacity mobile multimedia with high data rates and is intended to be used not only for human interaction, but also for machine type communications in so-called Internet of Things (IoT) networks. Sixth generation (6G) technology further builds off 5G technology to provide high yield increased processing speeds.

BRIEF SUMMARY

A method, apparatus, and computer program product are disclosed for a multiple donor supported repeater in communication networks. A multiple donor supported repeater may allow for a repeater node to receive physical beam channels from one or more donor nodes. Advantageously, this decreases the reliance of a repeater node on a single donor node as well as decreases demand on the single donor node. As such, individual donor nodes may more effectively operate as the demand for their physical beam channels as required by the repeater node may be distributed amongst one or more additional donor nodes. This allows for individual donor nodes to retain more of their physical beam channels while still supplying the repeater node with a sufficient number of physical beam channels such that the repeater node may effectively serve one or more user devices within its associated access area. Additionally, the repeater node may continue serving the one or more user devices within its access area in instances where a donor node experiences a link failure or in instances where the repeater node may be mobile.

In an example embodiment, a method is provided for establishing a control channel with a respective donor node of one or more donor nodes. The method may further include receiving an indication of resource information from the one or more donor nodes via the corresponding control channel. The method may further include determining a grid of physical repeater beam channels to cover an access area based at least in part on the received indication of resource information from the one or more donor nodes, wherein (i) the grid of physical repeater beam channels comprises one or more physical repeater beam channels, (ii) a respective physical repeater beam channel is associated with a physical beam channel from a particular donor node, (iii) the respective physical repeater beam channel is associated with one or more configuration parameters, and (iv) the respective physical repeater beam channel covers at least a portion of the access area.

In some embodiments, the method further includes providing the respective donor node with an indication of the grid of physical repeater beam channels, wherein the indication of the grid of physical repeater beam channels includes at least the one or more configuration parameters associated with physical repeater beam channels which correspond to the particular donor node.

In some embodiments, the method further includes determining whether a conflict exists between the one or more donor nodes based at least in part on the received indication of resource information for the respective donor node, wherein a conflict occurs in an instance the resource information received from the one or more donor nodes indicates an overlap in time and frequency of the one or more donor nodes. In some embodiments, the method further includes, in an instance the resource information received from the one or more donor nodes overlaps in time and frequency, using the one or more control channels for the respective donor node associated with the conflict to resolve the conflict.

In some embodiments, the indication of resource information includes at least a count of synchronization signal block resources, a count of random access channel occasions, physical downlink control channel configuration information, channel state information reference signal configuration information, or physical random access channel configuration information for respective donor nodes.

In some embodiments, a respective control channel is configured to multiplex user device traffic using time division multiplexing, frequency division multiplexing, or spatial division multiplexing.

In some embodiments, the method further includes determining a repeater schedule, wherein the repeater schedule includes one or more time slots. In some embodiments, the method further includes assigning one or more physical repeater beam channels a time slot in the repeater schedule, wherein during the time slot, the physical repeater beam channel may be used to provide one or more signals to one or more user devices within the portion of the access area corresponding to the physical repeater beam channel. In some embodiments, the method further includes providing the one or more donor nodes with an indication of the repeater schedule.

In some embodiments, the respective physical repeater beam channel is assigned a unique time slot within the repeater schedule. In some embodiments, in an instance a time slot includes two or more physical repeater beam channels, the two or more physical repeater beam channels are spatially non-adjacent physical repeater beam channels. In some embodiments, the respective physical repeater beam channel is assigned a time slot based at least in part on traffic needs or quality of service requirements for one or more user devices within the access area. In some embodiments, one or more time slots include a guard interval, and wherein during a guard interval time slot, no signaling is received or transmitted by the apparatus.

In some embodiments, the method further includes assigning a respective time slot an operational pattern configuration. In some embodiments, the method further includes enforcing signals received from or transmitted to the one or more donor nodes based at least in part on the operational pattern configuration for the corresponding time slot.

In some embodiments, the method further includes assigning a respective time slot one or more non-overlapping frequency band configurations. In some embodiments, the method further includes enforcing signals received from or transmitted to the one or more donor nodes based at least in part on the non-overlapping frequency band configuration for the corresponding time slot.

In some embodiments, the method further includes in an instance a donor node experiences an update event, updating the grid of physical repeater beam channels.

In some embodiments, the update event occurs in an instance one or more donor nodes experience a radio link failure or the apparatus is no longer within an associated donor access area for one or more donor nodes.

In some embodiments, the method further includes updating the grid of physical channels based at least in part on user device traffic load for respective one or more donor nodes.

In some embodiments, the method further includes detecting the one or more donor nodes using a backhaul beam sweep or synchronization signal block search operation, wherein the one or more donor nodes which are detected are associated with a signal strength which satisfies one or more signal strength thresholds.

In some embodiments, the method further includes providing a request for the indication of resource information to the one or more donor nodes using the corresponding control channel, wherein the request for the indication of resource information includes a requested number of physical beam channels from the corresponding donor node.

In some embodiments, the method further includes providing an indication of the signal repetition capability or beamforming capability of the apparatus to the one or more donor nodes.

In an example embodiment, an apparatus is provided with means for establishing a control channel with a respective donor node of one or more donor nodes. The apparatus may further include means for receiving an indication of resource information from the one or more donor nodes via the corresponding control channel. The apparatus may further include means for determining a grid of physical repeater beam channels to cover an access area based at least in part on the received indication of resource information from the one or more donor nodes, wherein (i) the grid of physical repeater beam channels comprises one or more physical repeater beam channels, (ii) a respective physical repeater beam channel is associated with a physical beam channel from a particular donor node, (iii) the respective physical repeater beam channel is associated with one or more configuration parameters, and (iv) the respective physical repeater beam channel covers at least a portion of the access area.

In some embodiments, the apparatus further includes means for providing the respective donor node with an indication of the grid of physical repeater beam channels, wherein the indication of the grid of physical repeater beam channels includes at least the one or more configuration parameters associated with physical repeater beam channels which correspond to the particular donor node.

In some embodiments, the apparatus further includes means for determining whether a conflict exists between the one or more donor nodes based at least in part on the received indication of resource information for the respective donor node, wherein a conflict occurs in an instance the resource information received from the one or more donor nodes indicates an overlap in time and frequency of the one or more donor nodes. In some embodiments, the apparatus further includes means for, in an instance the resource information received from the one or more donor nodes overlaps in time and frequency, using the one or more control channels for the respective donor node associated with the conflict to resolve the conflict.

In some embodiments, the indication of resource information includes at least a count of synchronization signal block resources, a count of random access channel occasions, physical downlink control channel configuration information, channel state information reference signal configuration information, or physical random access channel configuration information for respective donor nodes.

In some embodiments, a respective control channel is configured to multiplex user device traffic using time division multiplexing, frequency division multiplexing, or spatial division multiplexing In some embodiments, the apparatus further includes means for determining a repeater schedule, wherein the repeater schedule includes one or more time slots. In some embodiments, the apparatus further includes means for assigning one or more physical repeater beam channels a time slot in the repeater schedule, wherein during the time slot, the physical repeater beam channel may be used to provide one or more signals to one or more user devices within the portion of the access area corresponding to the physical repeater beam channel. In some embodiments, the apparatus further includes means for providing the one or more donor nodes with an indication of the repeater schedule.

In some embodiments, the respective physical repeater beam channel is assigned a unique time slot within the repeater schedule. In some embodiments, in an instance a time slot includes two or more physical repeater beam channels, the two or more physical repeater beam channels are spatially non-adjacent physical repeater beam channels. In some embodiments, the respective physical repeater beam channel is assigned a time slot based at least in part on traffic needs or quality of service requirements for one or more user devices within the access area. In some embodiments, one or more time slots include a guard interval, and wherein during a guard interval time slot, no signaling is received or transmitted by the apparatus.

In some embodiments, the apparatus further includes means for assigning a respective time slot an operational pattern configuration. In some embodiments, the apparatus further includes means for enforcing signals received from or transmitted to the one or more donor nodes based at least in part on the operational pattern configuration for the corresponding time slot.

In some embodiments, the apparatus further includes means for assigning a respective time slot one or more non-overlapping frequency band configurations. In some embodiments, the apparatus further includes means for enforcing signals received from or transmitted to the one or more donor nodes based at least in part on the non-overlapping frequency band configuration for the corresponding time slot.

In some embodiments, the apparatus further includes means, in an instance a donor node experiences an update event, for updating the grid of physical repeater beam channels.

In some embodiments, the update event occurs in an instance one or more donor nodes experience a radio link failure or the apparatus is no longer within an associated donor access area for one or more donor nodes.

In some embodiments, the apparatus further includes means for updating the grid of physical channels based at least in part on user device traffic load for respective one or more donor nodes.

In some embodiments, the apparatus further includes means for detecting the one or more donor nodes using a backhaul beam sweep or synchronization signal block search operation, wherein the one or more donor nodes which are detected are associated with a signal strength which satisfies one or more signal strength thresholds.

In some embodiments, the apparatus further includes means for providing a request for the indication of resource information to the one or more donor nodes using the corresponding control channel, wherein the request for the indication of resource information includes a requested number of physical beam channels from the corresponding donor node.

In some embodiments, the apparatus further includes means for providing an indication of the signal repetition capability or beamforming capability of the apparatus to the one or more donor nodes.

In an example embodiment, an apparatus is provided including processing circuitry and at least one memory including computer program code with the at least one memory and the computer program code configured to, with the processing circuitry, cause the apparatus at least to establish a control channel with a respective donor node of one or more donor nodes. In some embodiments, the at least one memory and the computer program code are further configured to, with the processing circuitry, cause the apparatus at least to receive an indication of resource information from the one or more donor nodes via the corresponding control channel. In some embodiments, the at least one memory and the computer program code are further configured to, with the processing circuitry, cause the apparatus at least to determine a grid of physical repeater beam channels to cover an access area based at least in part on the received indication of resource information from the one or more donor nodes, wherein (i) the grid of physical repeater beam channels comprises one or more physical repeater beam channels, (ii) a respective physical repeater beam channel is associated with a physical beam channel from a particular donor node, (iii) the respective physical repeater beam channel is associated with one or more configuration parameters, and (iv) the respective physical repeater beam channel covers at least a portion of the access area.

In some embodiments, the at least one memory and the computer program code are further configured to, with the processing circuitry, cause the apparatus at least to provide the respective donor node with an indication of the grid of physical repeater beam channels, wherein the indication of the grid of physical repeater beam channels includes at least the one or more configuration parameters associated with physical repeater beam channels which correspond to the particular donor node.

In some embodiments, the at least one memory and the computer program code are further configured to, with the processing circuitry, cause the apparatus at least to determine whether a conflict exists between the one or more donor nodes based at least in part on the received indication of resource information for the respective donor node, wherein a conflict occurs in an instance the resource information received from the one or more donor nodes indicates an overlap in time and frequency of the one or more donor nodes. In some embodiments, the at least one memory and the computer program code are further configured to, with the processing circuitry, cause the apparatus at least to, in an instance the resource information received from the one or more donor nodes overlaps in time and frequency, use the one or more control channels for the respective donor node associated with the conflict to resolve the conflict.

In some embodiments, the indication of resource information includes at least a count of synchronization signal block resources, a count of random access channel occasions, physical downlink control channel configuration information, channel state information reference signal configuration information, or physical random access channel configuration information for respective donor nodes.

In some embodiments, a respective control channel is configured to multiplex user device traffic using time division multiplexing, frequency division multiplexing, or spatial division multiplexing.

In some embodiments, the at least one memory and the computer program code are further configured to, with the processing circuitry, cause the apparatus at least to determine a repeater schedule, wherein the repeater schedule includes one or more time slots. In some embodiments, the at least one memory and the computer program code are further configured to, with the processing circuitry, cause the apparatus at least to assign one or more physical repeater beam channels a time slot in the repeater schedule, wherein during the time slot, the physical repeater beam channel may be used to provide one or more signals to one or more user devices within the portion of the access area corresponding to the physical repeater beam channel. In some embodiments, the at least one memory and the computer program code are further configured to, with the processing circuitry, cause the apparatus at least to provide the one or more donor nodes with an indication of the repeater schedule.

In some embodiments, the respective physical repeater beam channel is assigned a unique time slot within the repeater schedule. In some embodiments, in an instance a time slot includes two or more physical repeater beam channels, the two or more physical repeater beam channels are spatially non-adjacent physical repeater beam channels. In some embodiments, the respective physical repeater beam channel is assigned a time slot based at least in part on traffic needs or quality of service requirements for one or more user devices within the access area. In some embodiments, one or more time slots include a guard interval, and wherein during a guard interval time slot, no signaling is received or transmitted by the apparatus.

In some embodiments, the at least one memory and the computer program code are further configured to, with the processing circuitry, cause the apparatus at least to assign a respective time slot an operational pattern configuration. In some embodiments, the at least one memory and the computer program code are further configured to, with the processing circuitry, cause the apparatus at least to enforce signals received from or transmitted to the one or more donor nodes based at least in part on the operational pattern configuration for the corresponding time slot.

In some embodiments, the at least one memory and the computer program code are further configured to, with the processing circuitry, cause the apparatus at least to assign a respective time slot one or more non-overlapping frequency band configurations. In some embodiments, the at least one memory and the computer program code are further configured to, with the processing circuitry, cause the apparatus at least to enforce signals received from or transmitted to the one or more donor nodes based at least in part on the non-overlapping frequency band configuration for the corresponding time slot.

In some embodiments, the at least one memory and the computer program code are further configured to, with the processing circuitry, cause the apparatus at least to, in an instance a donor node experiences an update event, update the grid of physical repeater beam channels.

In some embodiments, the update event occurs in an instance one or more donor nodes experience a radio link failure or the apparatus is no longer within an associated donor access area for one or more donor nodes.

In some embodiments, the at least one memory and the computer program code are further configured to, with the processing circuitry, cause the apparatus at least to update the grid of physical channels based at least in part on user device traffic load for respective one or more donor nodes.

In some embodiments, the at least one memory and the computer program code are further configured to, with the processing circuitry, cause the apparatus at least to detect the one or more donor nodes using a backhaul beam sweep or synchronization signal block search operation, wherein the one or more donor nodes which are detected are associated with a signal strength which satisfies one or more signal strength thresholds.

In some embodiments, the at least one memory and the computer program code are further configured to, with the processing circuitry, cause the apparatus at least to provide a request for the indication of resource information to the one or more donor nodes using the corresponding control channel, wherein the request for the indication of resource information includes a requested number of physical beam channels from the corresponding donor node.

In some embodiments, the at least one memory and the computer program code are further configured to, with the processing circuitry, cause the apparatus at least to provide an indication of the signal repetition capability or beamforming capability of the apparatus to the one or more donor nodes.

In an example embodiment, a computer program product is provided that includes at least one non-transitory computer-readable storage medium having computer executable program code instructions stored therein with the computer executable program code instructions including program code instructions configured, upon execution, to establish a control channel with a respective donor node of one or more donor nodes. In some embodiments, the computer executable program code instructions further include program code instructions configured, upon execution, to receive an indication of resource information from the one or more donor nodes via the corresponding control channel. In some embodiments, the computer executable program code instructions further include program code instructions configured, upon execution, to determine a grid of physical repeater beam channels to cover an access area based at least in part on the received indication of resource information from the one or more donor nodes, wherein (i) the grid of physical repeater beam channels comprises one or more physical repeater beam channels, (ii) a respective physical repeater beam channel is associated with a physical beam channel from a particular donor node, (iii) the respective physical repeater beam channel is associated with one or more configuration parameters, and (iv) the respective physical repeater beam channel covers at least a portion of the access area.

In some embodiments, the computer executable program code instructions further include program code instructions configured, upon execution, to provide the respective donor node with an indication of the grid of physical repeater beam channels, wherein the indication of the grid of physical repeater beam channels includes at least the one or more configuration parameters associated with physical repeater beam channels which correspond to the particular donor node.

In some embodiments, the computer executable program code instructions further include program code instructions configured, upon execution, to determine whether a conflict exists between the one or more donor nodes based at least in part on the received indication of resource information for the respective donor node, wherein a conflict occurs in an instance the resource information received from the one or more donor nodes indicates an overlap in time and frequency of the one or more donor nodes. In some embodiments, the computer executable program code instructions further include program code instructions configured, upon execution, to, in an instance the resource information received from the one or more donor nodes overlaps in time and frequency, use the one or more control channels for the respective donor node associated with the conflict to resolve the conflict.

In some embodiments, the indication of resource information includes at least a count of synchronization signal block resources, a count of random access channel occasions, physical downlink control channel configuration information, channel state information reference signal configuration information, or physical random access channel configuration information for respective donor nodes.

In some embodiments, a respective control channel is configured to multiplex user device traffic using time division multiplexing, frequency division multiplexing, or spatial division multiplexing.

In some embodiments, the computer executable program code instructions further include program code instructions configured, upon execution, to determine a repeater schedule, wherein the repeater schedule includes one or more time slots. In some embodiments, the computer executable program code instructions further include program code instructions configured, upon execution, to assign one or more physical repeater beam channels a time slot in the repeater schedule, wherein during the time slot, the physical repeater beam channel may be used to provide one or more signals to one or more user devices within the portion of the access area corresponding to the physical repeater beam channel. The computer executable program code instructions further include program code instructions configured, upon execution, to provide the one or more donor nodes with an indication of the repeater schedule.

In some embodiments, the respective physical repeater beam channel is assigned a unique time slot within the repeater schedule. In some embodiments, in an instance a time slot includes two or more physical repeater beam channels, the two or more physical repeater beam channels are spatially non-adjacent physical repeater beam channels. In some embodiments, the respective physical repeater beam channel is assigned a time slot based at least in part on traffic needs or quality of service requirements for one or more user devices within the access area. In some embodiments, one or more time slots include a guard interval, and wherein during a guard interval time slot, no signaling is received or transmitted by the apparatus.

In some embodiments, the computer executable program code instructions further include program code instructions configured, upon execution, to assign a respective time slot an operational pattern configuration. In some embodiments, the computer executable program code instructions further include program code instructions configured, upon execution, to enforce signals received from or transmitted to the one or more donor nodes based at least in part on the operational pattern configuration for the corresponding time slot.

In some embodiments, the computer executable program code instructions further include program code instructions configured, upon execution, to assign a respective time slot one or more non-overlapping frequency band configurations. In some embodiments, the computer executable program code instructions further include program code instructions configured, upon execution, to enforce signals received from or transmitted to the one or more donor nodes based at least in part on the non-overlapping frequency band configuration for the corresponding time slot.

In some embodiments, the computer executable program code instructions further include program code instructions configured, upon execution, to, in an instance a donor node experiences an update event, update the grid of physical repeater beam channels.

In some embodiments, the update event occurs in an instance one or more donor nodes experience a radio link failure or the apparatus is no longer within an associated donor access area for one or more donor nodes.

In some embodiments, the computer executable program code instructions further include program code instructions configured, upon execution, to update the grid of physical channels based at least in part on user device traffic load for respective one or more donor nodes.

In some embodiments, the computer executable program code instructions further include program code instructions configured, upon execution, to detect the one or more donor nodes using a backhaul beam sweep or synchronization signal block search operation, wherein the one or more donor nodes which are detected are associated with a signal strength which satisfies one or more signal strength thresholds.

In some embodiments, the computer executable program code instructions further include program code instructions configured, upon execution, to provide a request for the indication of resource information to the one or more donor nodes using the corresponding control channel, wherein the request for the indication of resource information includes a requested number of physical beam channels from the corresponding donor node.

In some embodiments, the computer executable program code instructions further include program code instructions configured, upon execution, to provide an indication of the signal repetition capability or beamforming capability of the apparatus to the one or more donor nodes.

In an example embodiment, a method is provided that includes establishing a control channel with a repeater node. In some embodiments, the method further includes allocating one or more physical beam channels to dedicate to the repeater node. In some embodiments, the method further includes providing an indication of resource information to the repeater node. In some embodiments, the method further includes receiving an indication of a grid of physical repeater beam channels from the repeater node, wherein the indication of the grid of physical repeater beam channels includes at least one or more configuration parameters associated with one or more physical repeater beam channels which correspond to the apparatus.

In some embodiments, the method further includes establishing one or more communication channels with one or more other apparatuses associated with the repeater node. In some embodiments, the method further includes determining resource allocation based at least in part on an indication of resource allocation availability from the one or more other apparatuses.

In some embodiments, the method further includes providing an indication of operation status to the repeater node, wherein the indication of operation status includes at least one of an indication of loading status, radio link failure, channel quality, required UE transmit power, or timing advance information.

In some embodiments, the method further includes negotiating with the repeater node to, at least, allocate a maximum number of physical beam channels to the repeater node.

In an example embodiment, an apparatus is provided that includes means for establishing a control channel with a repeater node. In some embodiments, the apparatus further includes means for allocating one or more physical beam channels to dedicate to the repeater node. In some embodiments, the apparatus further includes means for providing an indication of resource information to the repeater node. In some embodiments, the apparatus further includes means for receiving an indication of a grid of physical repeater beam channels from the repeater node, wherein the indication of the grid of physical repeater beam channels includes at least one or more configuration parameters associated with one or more physical repeater beam channels which correspond to the apparatus.

In some embodiments, the apparatus further includes means for establishing one or more communication channels with one or more other apparatuses associated with the repeater node. In some embodiments, the apparatus further includes means for determining resource allocation based at least in part on an indication of resource allocation availability from the one or more other apparatuses.

In some embodiments, the apparatus further includes means for providing an indication of operation status to the repeater node, wherein the indication of operation status includes at least one of an indication of loading status, radio link failure, channel quality, required UE transmit power, or timing advance information.

In some embodiments, the apparatus further includes means for negotiating with the repeater node to, at least, allocate a maximum number of physical beam channels to the repeater node.

In an example embodiment, an apparatus is provided including processing circuitry and at least one memory including computer program code with the at least one memory and the computer program code configured to, with the processing circuitry, cause the apparatus at least to establish a control channel with a repeater node. In some embodiments, the at least one memory and the computer program code are further configured to, with the processing circuitry, cause the apparatus at least to allocate one or more physical beam channels to dedicate to the repeater node. In some embodiments, the at least one memory and the computer program code are further configured to, with the processing circuitry, cause the apparatus at least to provide an indication of resource information to the repeater node. In some embodiments, the at least one memory and the computer program code are further configured to, with the processing circuitry, cause the apparatus at least to receive an indication of a grid of physical repeater beam channels from the repeater node, wherein the indication of the grid of physical repeater beam channels includes at least one or more configuration parameters associated with one or more physical repeater beam channels which correspond to the apparatus.

In some embodiments, the at least one memory and the computer program code are further configured to, with the processing circuitry, cause the apparatus at least to establish one or more communication channels with one or more other apparatuses associated with the repeater node. In some embodiments, the at least one memory and the computer program code are further configured to, with the processing circuitry, cause the apparatus at least to determine resource allocation based at least in part on an indication of resource allocation availability from the one or more other apparatuses.

In some embodiments, the at least one memory and the computer program code are further configured to, with the processing circuitry, cause the apparatus at least to provide an indication of operation status to the repeater node, wherein the indication of operation status includes at least one of an indication of loading status, radio link failure, channel quality, required UE transmit power, or timing advance information.

In some embodiments, the at least one memory and the computer program code are further configured to, with the processing circuitry, cause the apparatus at least to negotiate with the repeater node to, at least, allocate a maximum number of physical beam channels to the repeater node.

In an example embodiment, a computer program product is provided that includes at least one non-transitory computer-readable storage medium having computer executable program code instructions stored therein with the computer executable program code instructions including program code instructions configured, upon execution, to establish a control channel with a repeater node. In some embodiments, the computer executable program code instructions further include program code instructions configured, upon execution, to allocate one or more physical beam channels to dedicate to the repeater node. In some embodiments, the computer executable program code instructions further include program code instructions configured, upon execution, to provide an indication of resource information to the repeater node. In some embodiments, the computer executable program code instructions further include program code instructions configured, upon execution, to receive an indication of a grid of physical repeater beam channels from the repeater node, wherein the indication of the grid of physical repeater beam channels includes at least one or more configuration parameters associated with one or more physical repeater beam channels which correspond to the apparatus.

In some embodiments, the computer executable program code instructions further include program code instructions configured, upon execution, to establish one or more communication channels with one or more other apparatuses associated with the repeater node. In some embodiments, the computer executable program code instructions further include program code instructions configured, upon execution, to determine resource allocation based at least in part on an indication of resource allocation availability from the one or more other apparatuses.

In some embodiments, the computer executable program code instructions further include program code instructions configured, upon execution, to provide an indication of operation status to the repeater node, wherein the indication of operation status includes at least one of an indication of loading status, radio link failure, channel quality, required UE transmit power, or timing advance information.

In some embodiments, the computer executable program code instructions further include program code instructions configured, upon execution, to negotiate with the repeater node to, at least, allocate a maximum number of physical beam channels to the repeater node.

BRIEF DESCRIPTION OF THE DRAWINGS

Figure 1:
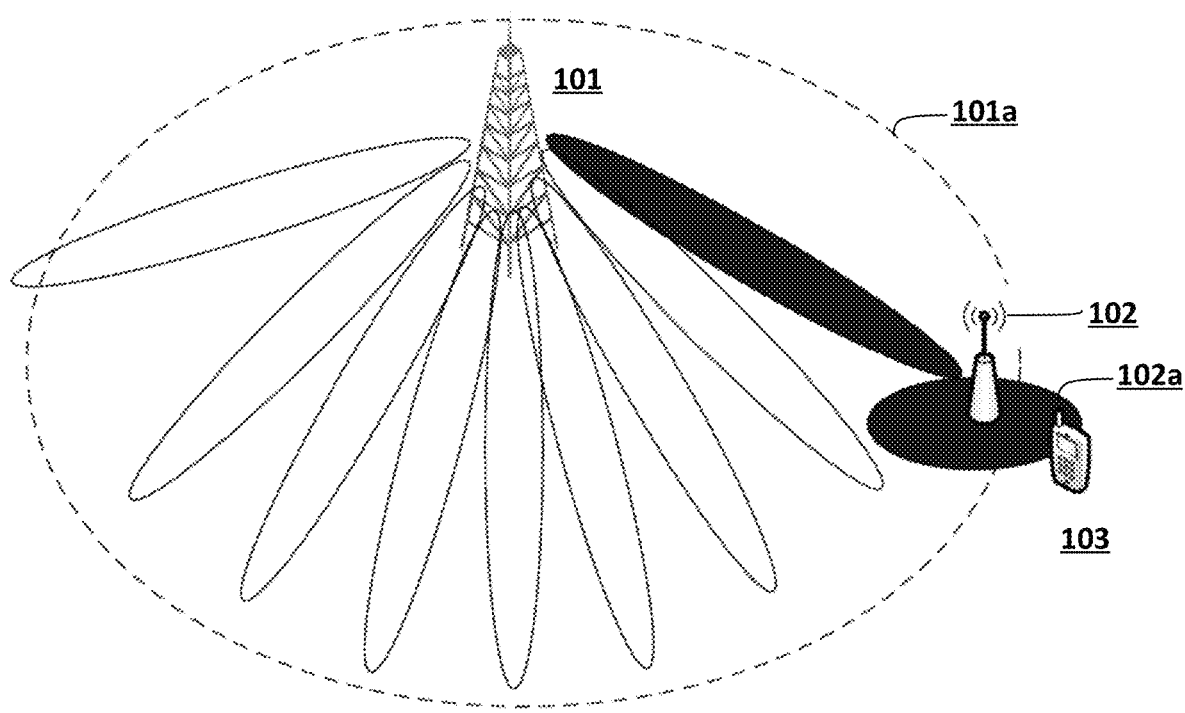
Figure 2A:
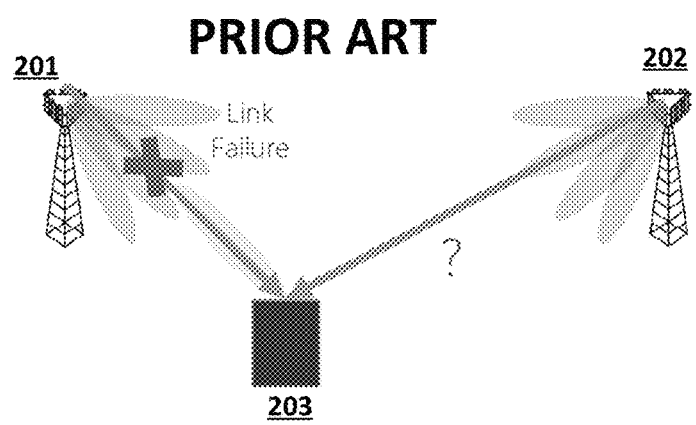
Figure 2B:
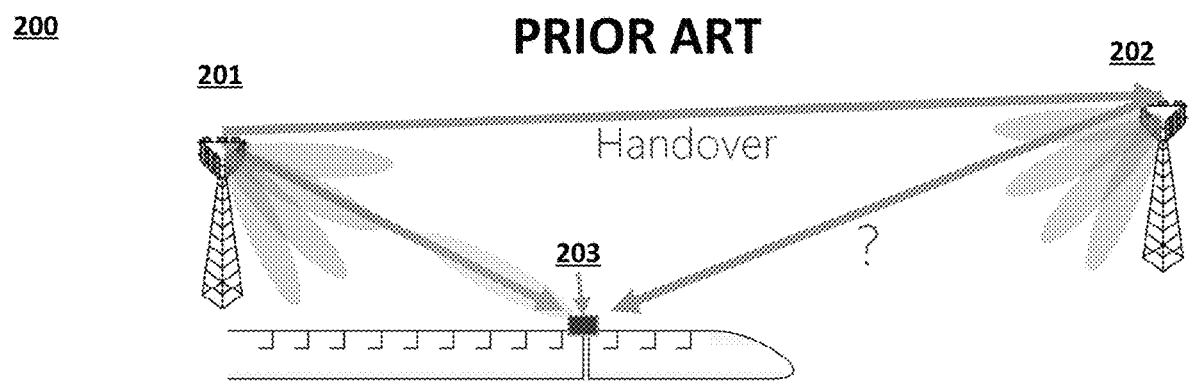
Figure 3:
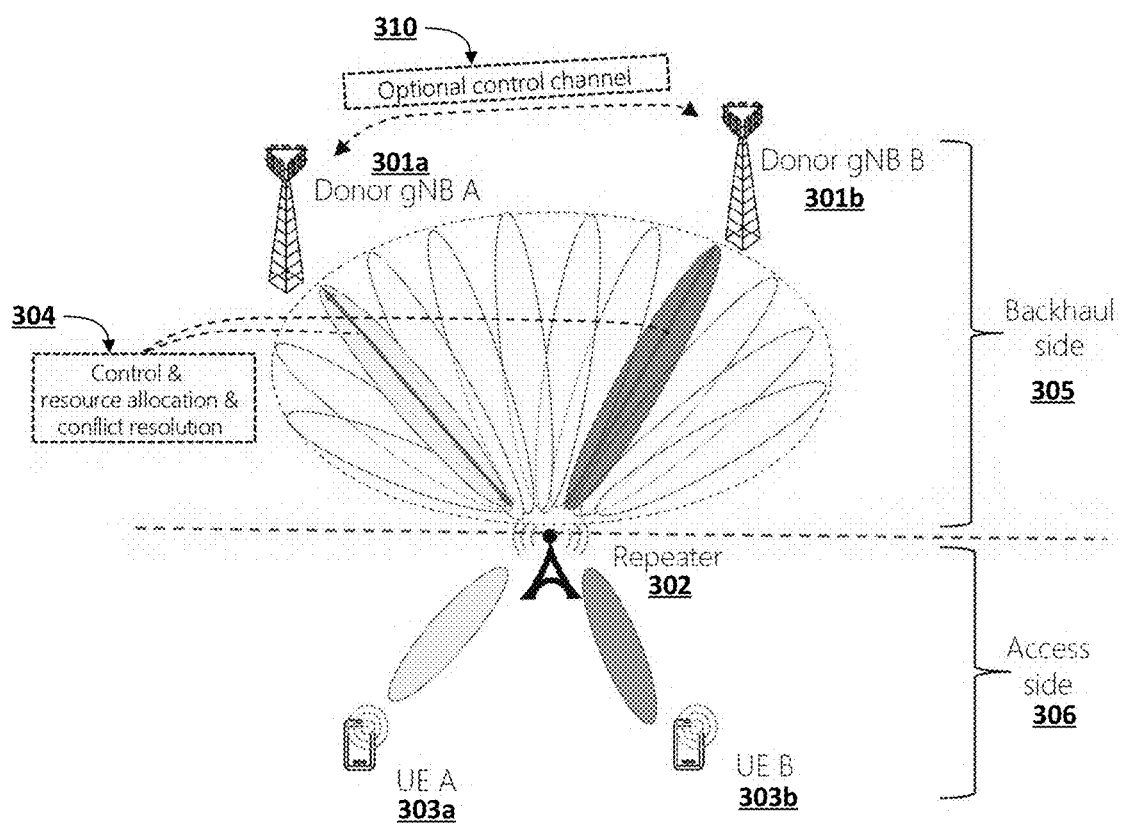
Figure 4:
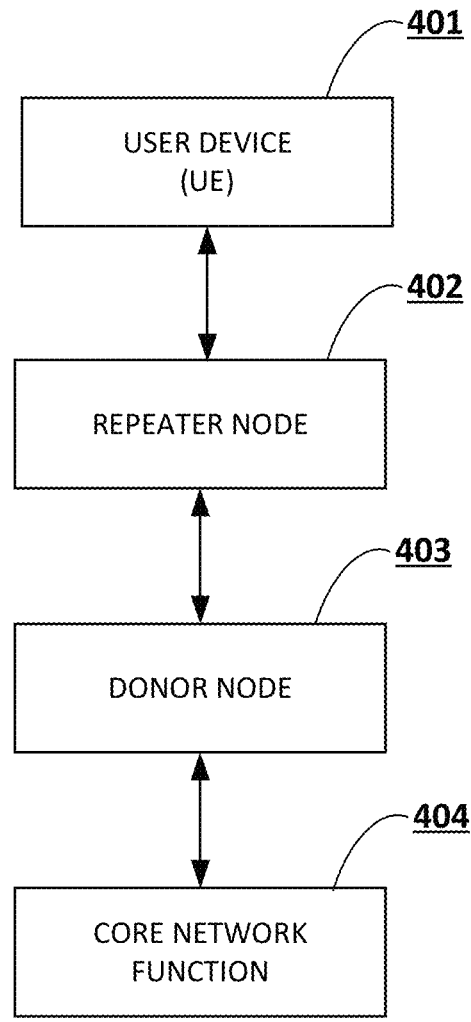
Figure 5:
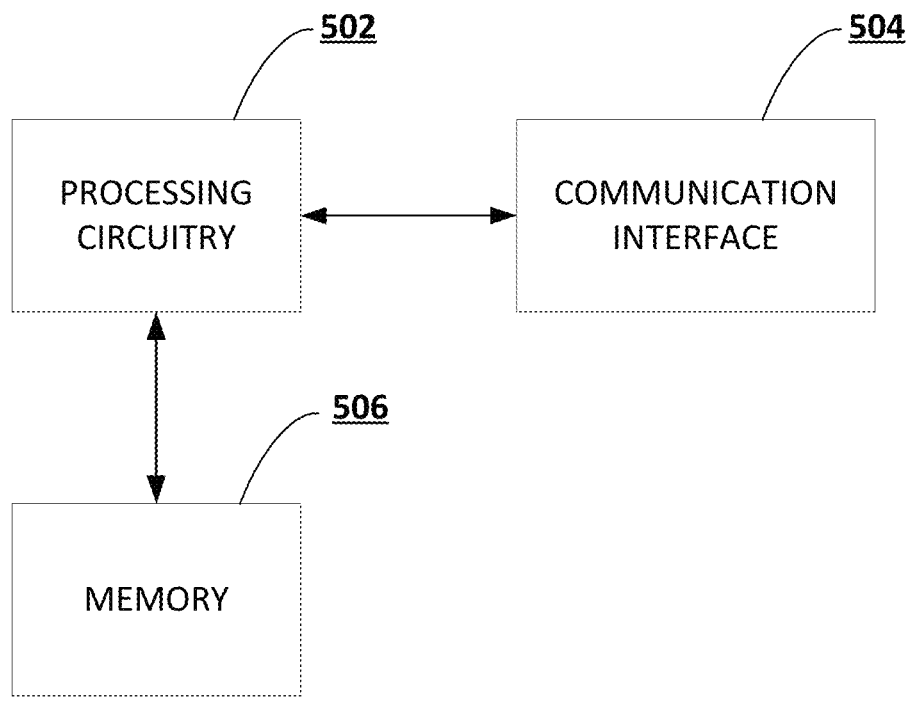
Figure 6:
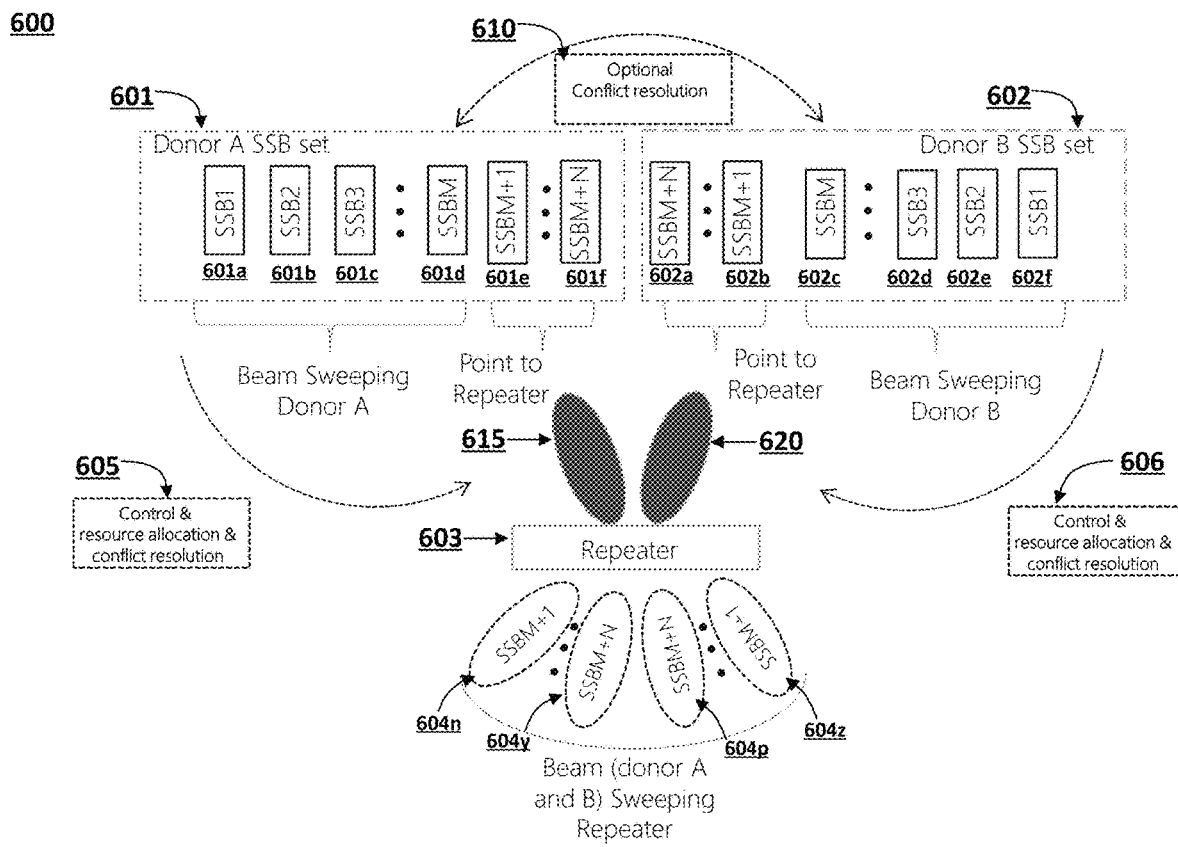
Figure 7:
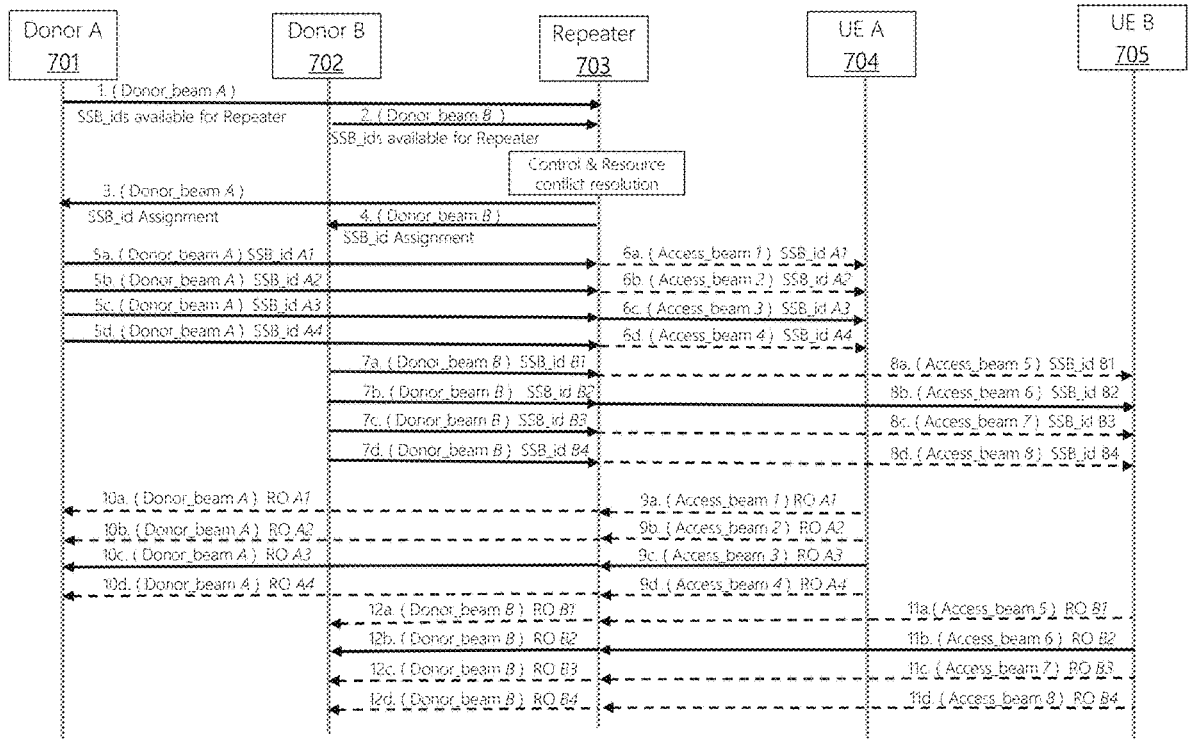
Figure 8:
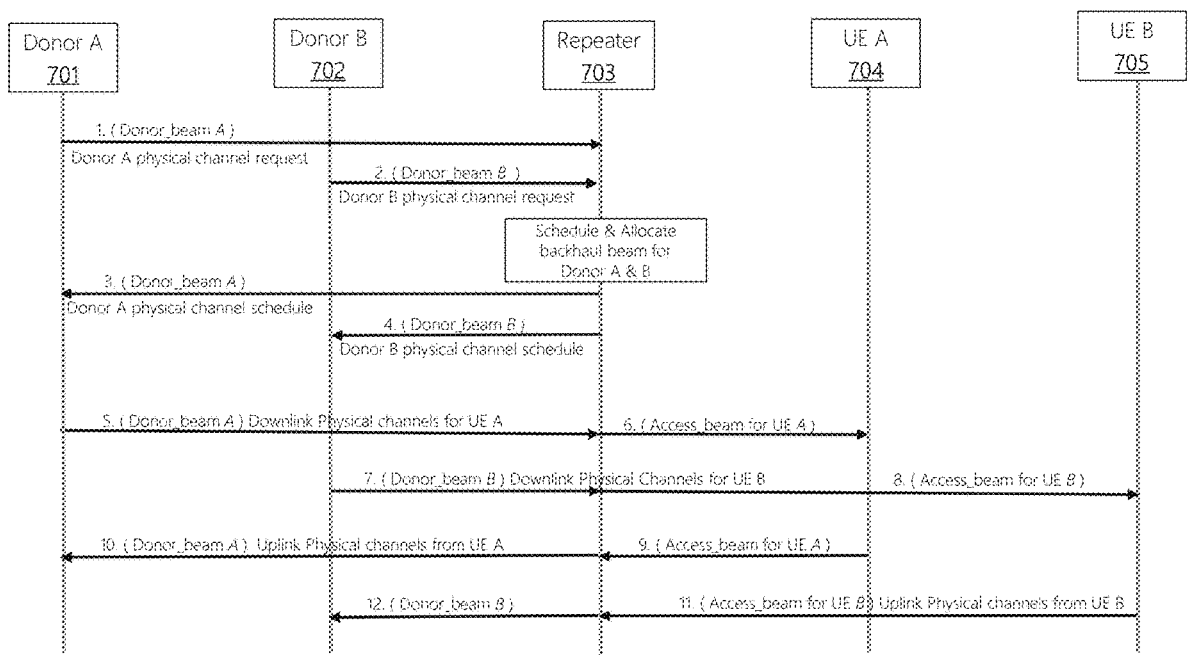
Figure 9:
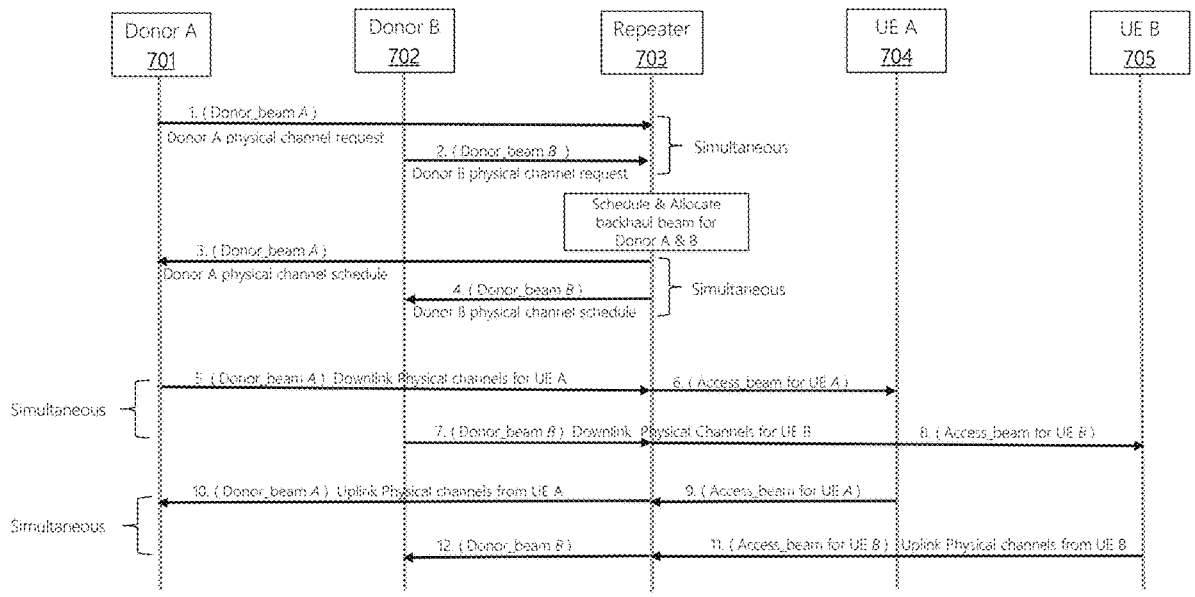
Figure 10:
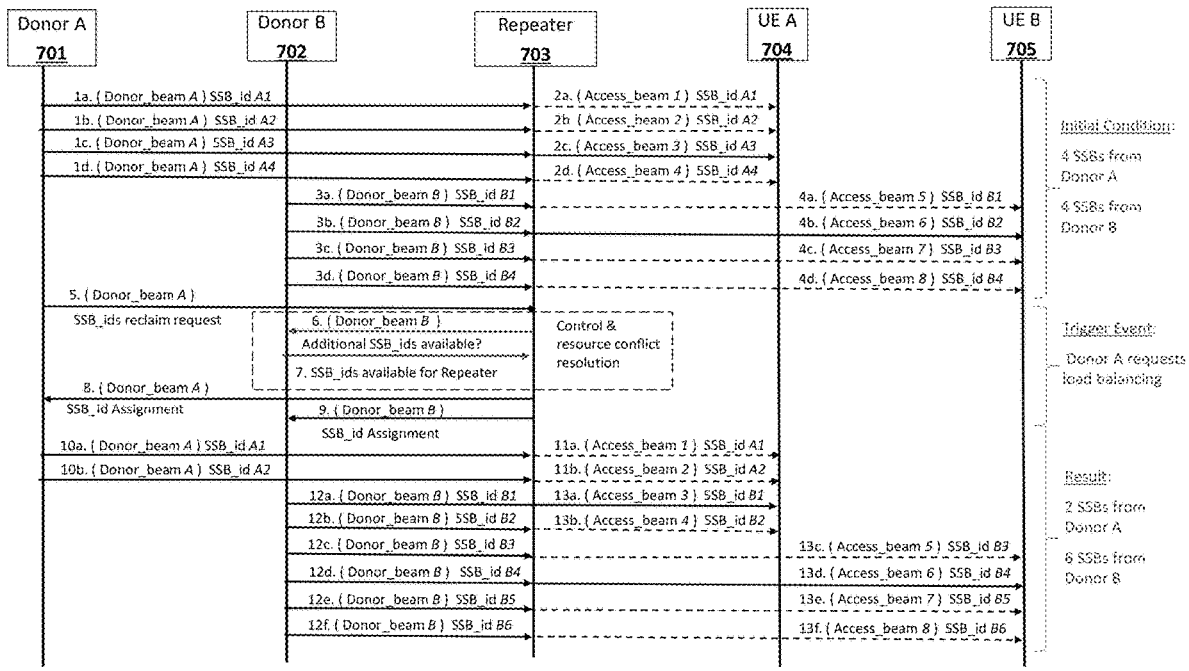
Figure 11:
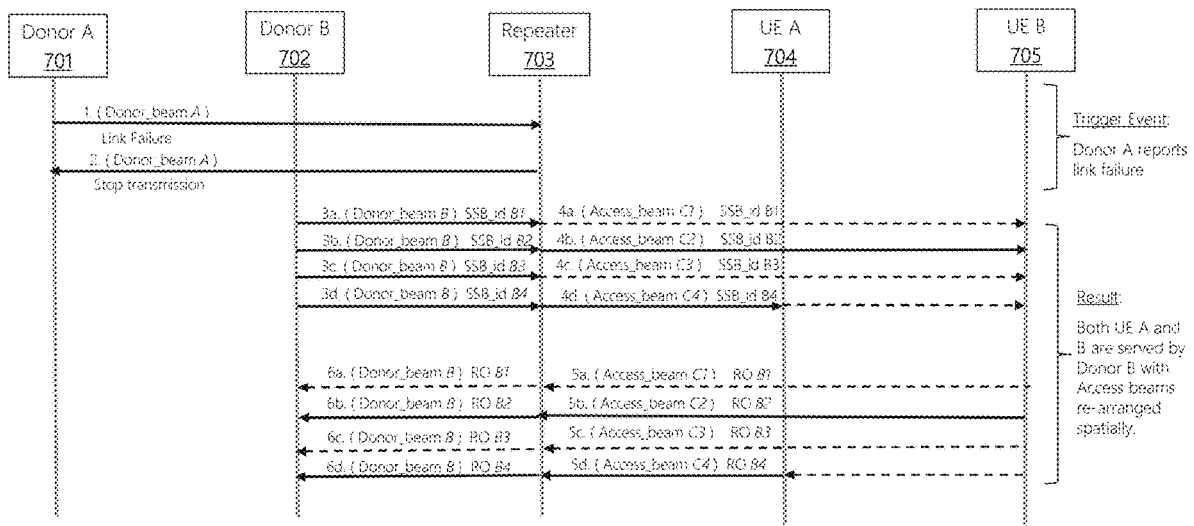
Figure 12:
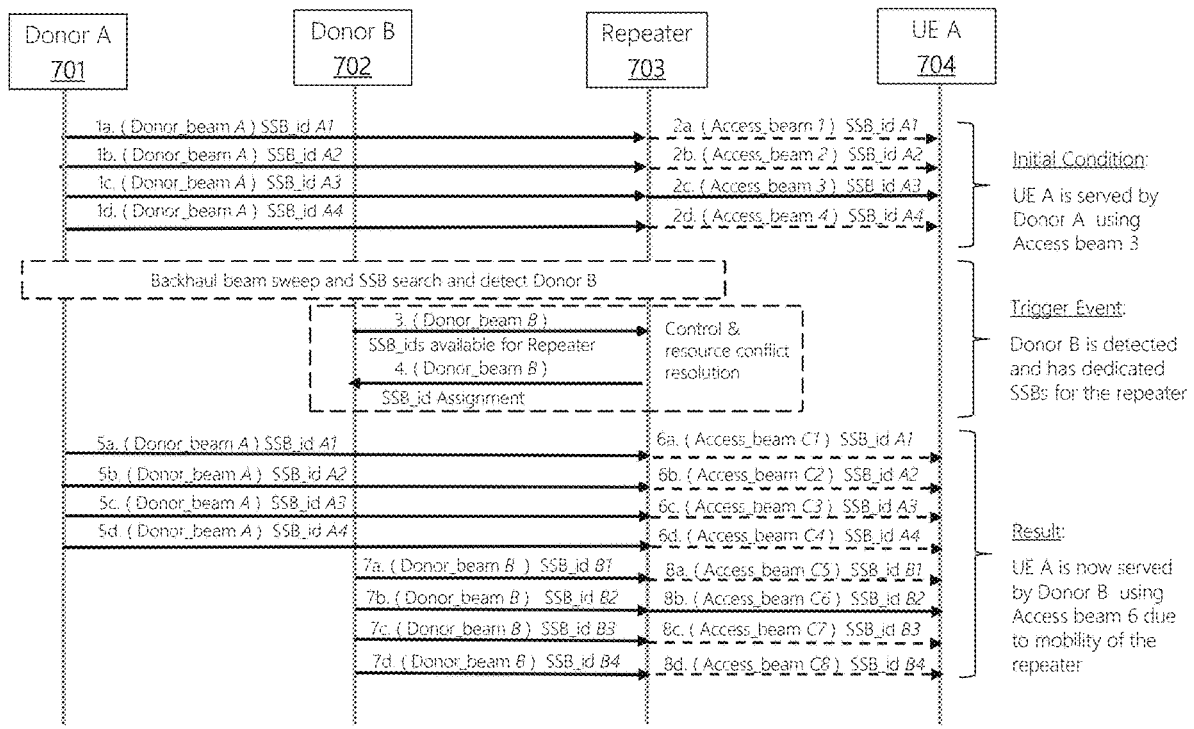
Figure 13:
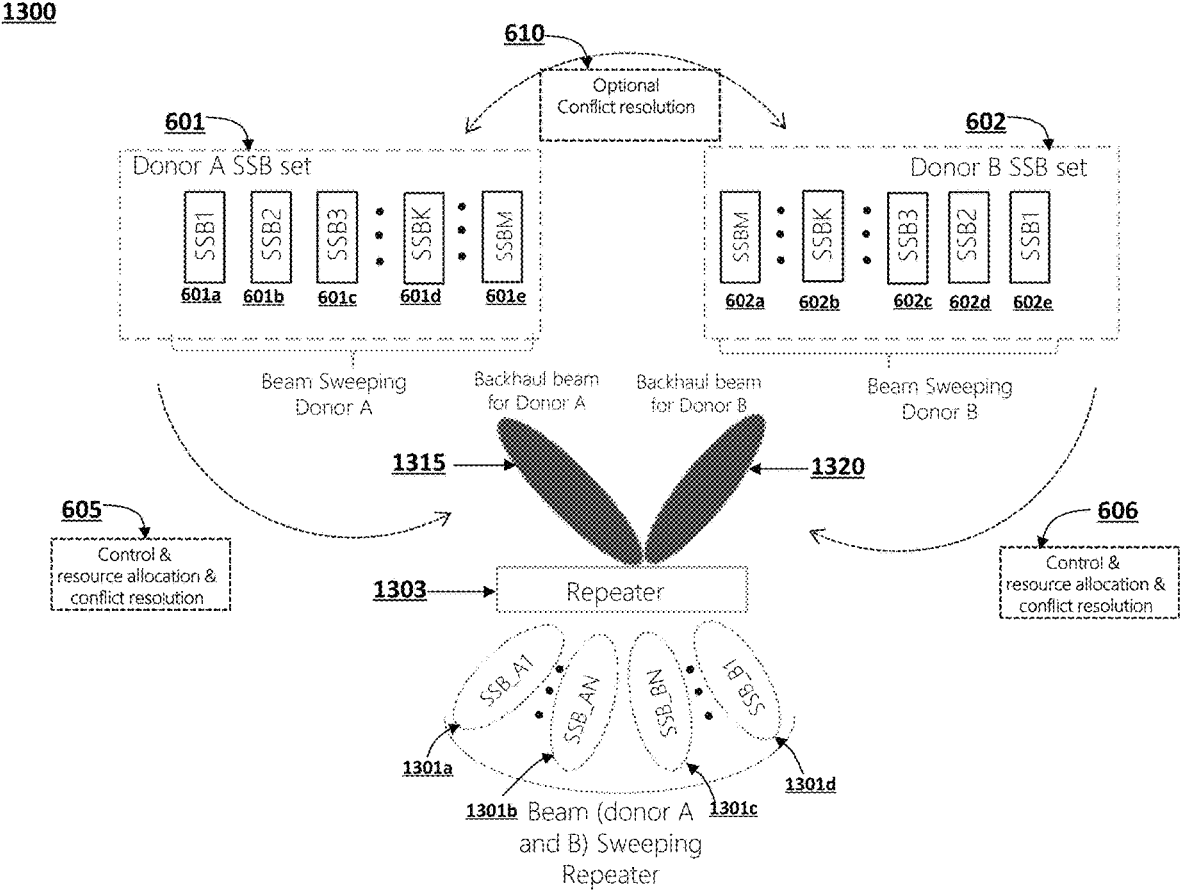
Figure 14:
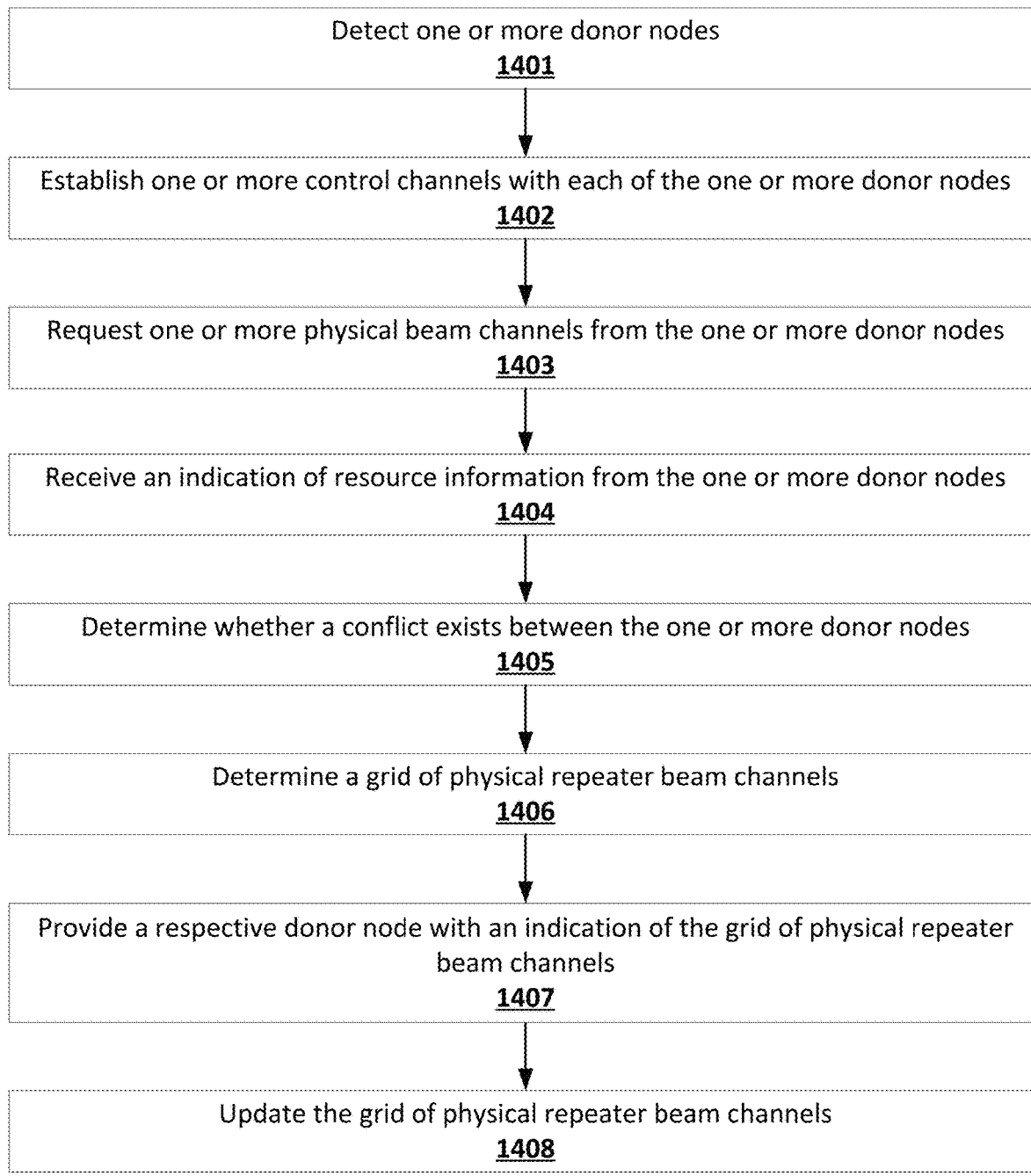
Figure 15:
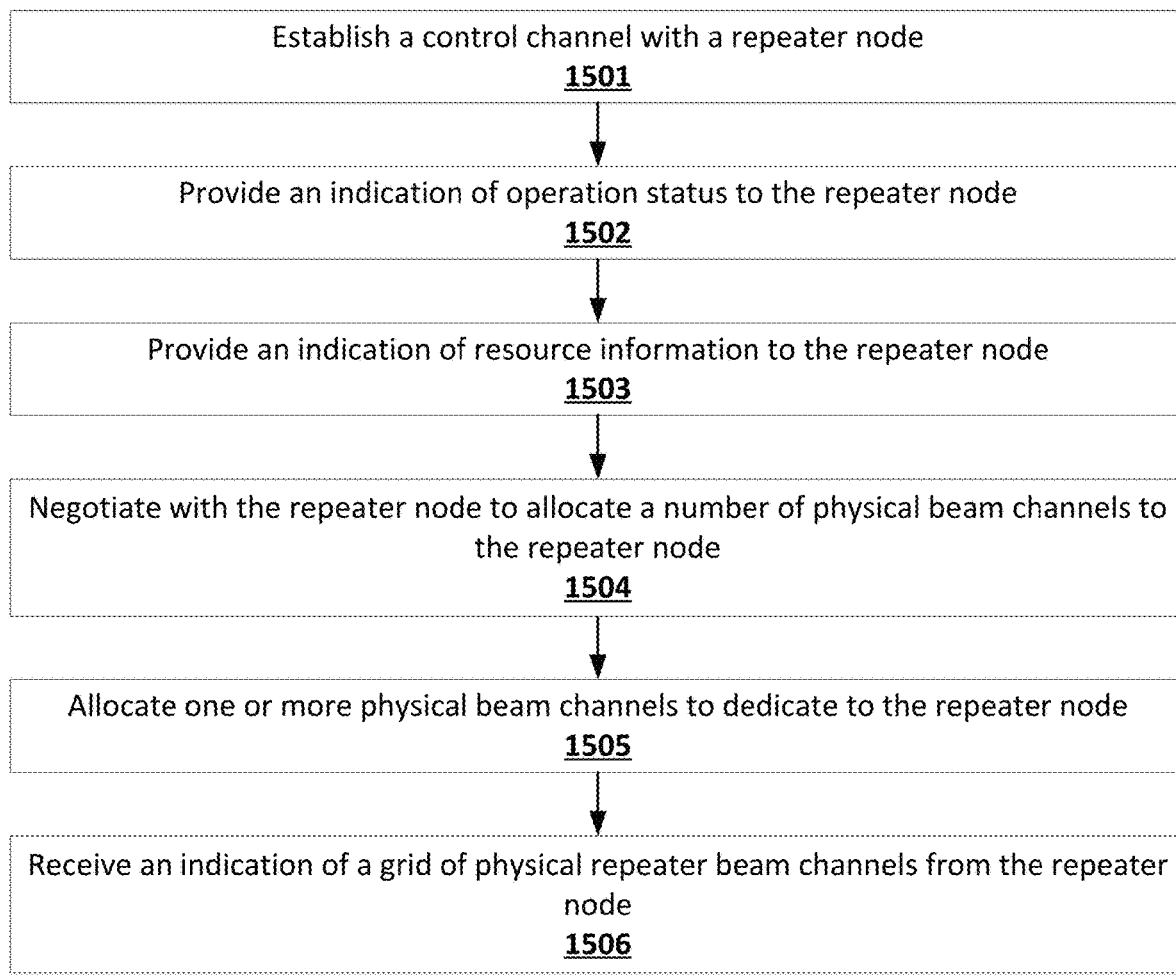
Figure 16:
Figure 16:

Having thus described certain example embodiments of the present disclosure in general terms, reference will hereinafter be made to the accompanying drawings, which are not necessarily drawn to scale, and wherein:

FIG. 1 depicts a conventional repeater node within a communication network;

FIGS. 2A-B depict a conventional repeater node during disruption incidents;

FIG. 3 depicts a repeater node within a communication network in an illustrative embodiment;

FIG. 4 shows a communication system in an illustrative embodiment;

FIG. 5 is a block diagram of an apparatus that may be specifically configured in accordance with an example embodiment of the present disclosure;

FIG. 6 depicts interaction between a repeater node and one or more donor nodes in an illustrative embodiment;

FIG. 7 shows a message flow for messages for determination of a grid of physical repeater beam channels by a repeater node in an illustrative embodiment;

FIG. 8 shows a message flow for messages for determination of a grid of physical repeater beam channels by a repeater node operating within time domain multiplexing in an illustrative embodiment;

FIG. 9 shows a message flow for messages for determination of a grid of physical repeater beam channels by a repeater node operating within spatial domain multiplexing in an illustrative embodiment;

FIG. 10 shows a message flow for messages for determination of a grid of physical repeater beam channels by a repeater node when a donor node requests load balancing in an illustrative embodiment;

FIG. 11 shows a message flow for messages for determination of a grid of physical repeater beam channels by a repeater node when a donor node experiences a link failure in an illustrative embodiment;

FIG. 12 shows a message flow for messages for determination of a grid of physical repeater beam channels by a repeater node when the repeater node is mobile in an illustrative embodiment;

FIG. 13 depicts interaction between a repeater node and one or more donor nodes when a repeater node is configured to generate one or more of its own physical repeater beam channels in an illustrative embodiment;

FIG. 14 illustrates a flow diagram for a method of determining a grid of physical repeater beam channels by a repeater node in an illustrative embodiment;

FIG. 15 illustrates a flow diagram for a method of providing an indication of resource information by a donor node in an illustrative embodiment; and FIG. 16 illustrates a flow diagram for a method of determining an indication of resource information by a donor node based at least in part on an indication of resource information from another donor node in an illustrative embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Communication technologies including second generation (2G) technologies, third generation (3G) technologies, fourth generation (4G) technologies, long term evolution (LTE) technologies, fifth generation (5G) technologies, and sixth generation (6G) technologies rely on nodes within an access network (AN), such as a radio access network (RAN), to facilitate communications between user equipment (UE) and a core network. However, such access networks may experience coverage holes due to various issues, such as shadowing, outside-to-inside losses, interference, and/or the like. These coverage holes are gaps within the communication network such that UEs within these coverage holes may not be able to communicate with the communication network.

Radio frequency (RF) repeaters nodes (e.g., amplify-and-forward relays) may be used to patch coverage holes as well as extend communication network coverage to areas where such coverage has traditionally been unavailable, such as inside well-shielded buildings. Repeater nodes may thus provide network coverage extension by receiving a signal from a nearby AN node and amplifying and retransmitting the signal to the corresponding nearby UEs in the downlink direction and/or receiving a signal from nearby UEs and amplifying and retransmitting the signals to the corresponding nearby AN node in the uplink direction.

In 5G, integrated access backhaul (IAB) techniques were introduced that employed a decode-and-forward technique to patch coverage holes. IAB nodes are able to leverage the spectral efficiencies of new radio (NR) and the increased capacity afforded by the higher frequency bands available in 5G to patch these coverage holes. While both repeater nodes and IAB nodes improve communication network coverage, repeater nodes are significantly more cost effective, consume less energy, as well as have a smaller form factor and lighter weight, making them easier to deploy than IAB nodes.

While repeater nodes provide a cost-effective solution to fill communication network coverage holes and/or extend coverage range with wireless backhauling, conventional repeaters are restricted to use with a single donor node. A donor node may be a distributed unit of an AN node, such as a next generation node B (gNB) or may be a distributed unit of an IAB node. Repeater nodes are non-regenerative and thus must rely on using a dedicated physical resource (e.g., a physical beam channel), such as a synchronization signal block (SSB) signal. However, this use of physical resources from a donor node may reduce the performance of the donor node. For example, the SSBs the repeater node borrows from the donor node will leave the donor node with fewer SSBs. Thus, the donor node will be forced to use a wider beamwidths for its remaining SSB beams to cover the same steering range as before, resulting in less beamforming gain. This may result in a smaller coverage area and/or worse signal to noise (SNR) at the cell zone edge for the donor node.

For example, FIG. 1 illustrates a conventional communication network 100 which employs a repeater node 102 which relies on a single donor node 101. The donor node 101 may be associated with a donor node access area 101a, within which donor node 101 may receive and/or provide wireless signals. A repeater node 102 may be placed within the donor node access area 101a such that it is capable of receiving signals from and/or providing signals to the donor node 101. The donor node 101 may provide the repeater node 102 with one or more physical beam channels, such as one or more SSBs. The repeater node 102 may be associated with a repeater node access area 102a, within which it may receive wireless signals from and/or provide wireless signals to one or more user devices (UEs), such as UE 103. The repeater node access area 102a may extend the coverage area as covered by the donor node access area 101a such that a UE 103, which is outside of the donor node access area 101a but within the repeater node access area 102a, may be communicable with the repeater node 102 and thus connected to the donor node 101 using the repeater node 102. However, the repeater node 102 in the conventional communication network 100 must rely on the single donor node 101 to supply all the required physical beam channels for the repeater node 302, which are used for the provided physical repeater beam channels. Furthermore, if there is more than one repeater node within the donor node cell 101a, the donor node 101 is required to further dedicate physical beam channels to the repeater nodes, thus reducing the efficiency and network coverage area for the donor node 101.

Additionally, there are other drawbacks associated with repeater nodes which rely on single donor nodes. For example, as depicted in FIG. 2A, in the event a link failure occurs with a currently serving donor node 201, there is no connection between a fallback donor node 202 and a repeater node 203. As such, a link failure within the currently serving donor node 201 would result in a service outage in the repeater node 203. As another example, as depicted in FIG. 2B, in an instance a repeater node is mobile, such as when placed on a vehicle (e.g., train, bus, car, etc.), switching serving donor nodes is not possible. While it is possible to mount a repeater node 203 onto a vehicle to provide enhanced service for the UEs within the vehicle, this requires the repeater node support the mobility and allow the repeater node to switch an associated backhaul beam from a current donor node 201 to a new donor node 202, which is not currently possible within existing systems. Rather, this requires a handover to occur between the current donor node 201 and the new donor node 202, thus increasing network latency and consumption of network resources.

As such, it may be advantageous for a repeater node to support a plurality of donor nodes. The repeater node may pool the dedicated time-frequency resources from a respective donor node to serve the UEs within an access area of the repeater node. The use of a plurality of donor nodes may alleviate the reliance of the repeater node on a single donor node to supply the required physical beam channels, and thus, a respective donor node may better conserve its resources and maintain performance and efficiency. Furthermore, a repeater node in certain embodiments of the present disclosure may use its backhaul panel to provide backhaul physical beam channels to communicate with the plurality of donor nodes in a time domain multiplexing (TDM) fashion and/or a spatial domain multiplexing (SDM) fashion according to the needs of the user traffic within an access coverage area served by the repeater node. The pool of donor nodes which serves the repeater node may also be dynamically adjusted in response to a need for user traffic load balancing, donor node link failure, repeater node mobility, and/or the like. In some embodiments, the required signaling for control, resource allocation, and conflict resolution between the repeater node and the plurality of donor nodes may satisfy 5G standards such that certain embodiments of the present invention may be used in 5G new radio (NR) communication networks. However, other embodiments may be deployed in other types of communication networks.

FIG. 3 illustrates an example communication network 300 within which certain illustrative embodiments are to be implemented. However, it is to be appreciated that embodiments are not limited to the network configurations illustrated herein or otherwise described below. It is to be understood that the elements shown in communication system 300 are intended to represent an example embodiment of a repeater node in communication with two donor nodes and two UEs. However, any number of UEs and donor nodes may be contemplated.

As depicted in FIG. 3, a repeater node 302 is shown which is capable of supporting a plurality of donor nodes 301a-301b. The repeater node 302 may be associated with both a backhaul side 305 used to communicate with the plurality of donor nodes 301a-301b as well as an access side 306 used to communicate with one or more UEs 303a-303b. Within the backhaul side, the repeater node 302 may use a backhaul panel configured with one or more transmitters and/or receivers. The backhaul panel may be used to provide a backhaul physical beam channel to the one or more donor nodes 301a-b and receive one or more physical beam channels from the one or more donor nodes 301a-b. On the access side, the repeater node 302 may use an access panel configured with one or more transmitters and/or receivers. The access panel may be used to provide a physical repeater beam channel to one or more UEs 303a-b and receive one or more random access channel (RACH) occasions from the one or more UEs 303a-b within an access area associated with the repeater node 302.

The one or more UEs 303a-303b may a respective be within an associated repeater access area such that the repeater node 302 and the one or more UEs 303a-303b may both receive and provide wireless signals to and from one another. Within the backhaul side 305, the repeater node 302 may establish a control channel, such as a control and resource allocation and conflict channel 304, with a respective of the plurality of donor nodes 301a-301b. The control and resource allocation and conflict channel 304 may be used to negotiate with the plurality of donor nodes 301a-301b for dedicated physical beam channels as will be discussed in greater detail below. A dedicated physical beam channel may correspond to a particular SSB beam as provided by a donor node. In some embodiments, the repeater node 302 may position an associated backhaul physical beam channel to receive the physical beam channel as transmitted by one or more donor nodes. In some embodiments, a control channel 310 may be established between two or more donor nodes, such as between donor node A 301a and donor node B 301b. The control channel 310 may allow for communication between the two or more donor nodes. In some embodiments, the respective donor node A 301a and/or donor node B 301b may also be configured with one or more backhaul physical beam channels. The one or more backhaul physical beam channels may be configured to provide the one or more physical beam channels to the repeater node and/or receive one or more backhaul physical channels from the repeater node 302.

FIG. 4 shows a communication system 400 within which certain illustrative embodiments are to be implemented. However, it is to be appreciated that embodiments are not limited to the network configurations illustrated herein or otherwise described below. It is to be understood that the elements shown in communication system 400 are intended to represent a primary function provided within the system. As such, the blocks shown in FIG. 4 reference specific elements in 5G networks that provide the primary functions. However, other network elements may be used to implement some or all of the primary functions represented. Also, it is to be understood that not all functions of a 5G network are depicted in FIG. 4. Rather, functions that facilitate an explanation of an illustrative embodiment are represented.

By way of example, the communication system 400 may be deployed within a radio access architecture. However, the system may be deployed in other applications including within other communication networks including, for example, long term evolution advanced (LTE Advanced, LTE-A), a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network eligible to access the 5G core network such as an Un-trusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the next generation radio access node (NG RAN)/donor node. Moreover, although described herein in conjunction with a 5G core network, the method, apparatus and computer program product of certain example embodiments may be employed in conjunction with other technologies, such as a 6G network or the like.

In the radio access architecture of FIG. 4, UE 401 is configured to be in a wireless connection on one or more communication channels in a cell with a repeater node 402 and/or donor node 403, such as a next generation Node B (gNB) or IAB node. The physical link from a UE 401 to a repeater node and/or donor node is called the uplink or reverse link and the physical link from the repeater node and/or donor node to the UE is called the downlink or forward link. It should be appreciated that the donor nodes, or their functionalities may be implemented by using any node, host, server or access point (AP), etc. suitable for such a usage.

A communications system typically comprises more than one donor node and/or repeater node, in which case the donor nodes and/or repeater nodes may also be configured to communicate with one another over links, wired or wireless, designed for the purpose. These links may be used for signaling purposes. The donor node is a computing device configured to control the radio resources of the communication system to which the donor node is coupled. The repeater node is a computing device configured to amplify and forward signals from donor nodes within the communication system. The donor node may also be referred to as a base station, an access point or any other type of interfacing device including a relay station capable of operating in a wireless environment. The donor node includes or is coupled to transceiver(s). From the transceivers of the donor node and/or repeater nodes, a connection is provided to an antenna unit that establishes bi-directional radio links to UEs. As such, the transceivers of the donor node and the transceivers of the UEs may include transmitters and receivers configured to communicate via a channel.

A repeater node 402 may be configured to receive one or more signals from and/or provide one or more signals to one or more donor nodes using an associated backhaul panel configured with one or more transmitters and/or receivers. The backhaul panel may be capable of receiving one or more signals from the one or more donor nodes and providing one or more signals to the one or more donor nodes. A repeater node 402 may also be configured to receive one or more signals from and/or provide one or more signals to one or more user devices using an associated access panel configured with one or more transmitters and/or receivers. The access panel may be capable of receiving one or more signals from the one or more UEs and providing one or more signals to the one or more UEs.

Accordingly, as shown, communication system 400 comprises UE 401 that communicates, such as via an air interface, with a repeater node 402 and/or donor node 403. In some embodiments, the donor node 403 is a radio access network (RAN) node, such as a gNB, or an IAB node. The UE 401 may be a mobile station, and such a mobile station may comprise, by way of example, a mobile telephone, a computer, or any other type of communication device. The term "user device" or "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). The UE 401 may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE may also be a nearly exclusive uplink only device, of which an example is a camera or video camera loading images or video clips to a network. A UE may also be a device having the capability to operate in an IoT network, which is a scenario in which objects are provided with the ability to transfer data over a network without requiring human-to-human or human-to-computer interaction. The user device (or in some embodiments a layer 3 relay node) is configured to perform one or more user device functionalities. The user device may also be called a subscriber unit, mobile station, remote terminal, access terminal, user terminal or user equipment just to mention but a few names or apparatuses.

In one embodiment, UE 401 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The donor node 403 is illustratively part of an AN of the communication system 400. In a 5GS network, the donor node is typically implemented by an gNB. Such an access network may comprise, for example, a plurality of base stations which may include one or more donor nodes (which may also be split in a centralized unit (CU) and a distributed unit (DU) part) and/or other AN node types, such as evolved node Bs (eNBs), node Bs, base stations (BTS) and/or non-3GPP interworking function (N3IWF), or any other types of access nodes such as WLAN access points, as well as one or more associated radio network control functions. The base stations and radio network control functions may be logically separate entities, but in a given embodiment may be implemented in the same physical network element, such as, for example, a base station router or femto cellular access point. As will be appreciated by one of skill in the art, any variety of AN nodes and/or access nodes may also implement similar operations, functions, etc.

In some example embodiments, the donor node 403 is operatively coupled to a core network function 404, such as via an NG interface. The core network function 404 may include an access and mobility management function (AMF), session management function (SMF), or any of core network function. A core network function may be an element of the core network (CN) part of the communication system 400 that is responsible for one or more associated operations.

One example of an apparatus 500 that may be configured to function as or may be embodied by a network entity, such as a UE, donor node, and/or repeater node, is depicted in FIG. 5. As shown in FIG. 5, the apparatus 500 includes, is associated with or is in communication with processing circuitry 502, a memory 506 and a communication interface 504. The processing circuitry 502 may be in communication with the memory device via a bus for passing information among components of the apparatus 500. The memory 506 (e.g., memory device) may be non-transitory and may include, for example, one or more volatile and/or non-volatile memories. In other words, for example, the memory 506 may be an electronic storage device (e.g., a computer readable storage medium) comprising gates configured to store data (e.g., bits) that may be retrievable by a machine (e.g., a computing device like the processing circuitry). The memory 506 may be configured to store information, data, content, applications, instructions, or the like for enabling the apparatus to carry out various functions in accordance with an example embodiment of the present disclosure. For example, the memory 506 could be configured to buffer input data for processing by the processing circuitry 502. Additionally or alternatively, the memory 506 could be configured to store instructions for execution by the processing circuitry 502.

The apparatus 500 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 502 may be embodied in a number of different ways. For example, the processing circuitry 502 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 502 may be configured to execute instructions stored in the memory 506 or otherwise accessible to the processing circuitry 502. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 502 is embodied as an executor of instructions, the instructions may specifically configure the processor to perform the algorithms and/or operations described herein when the instructions are executed. However, in some cases, the processing circuitry 502 may be a processor of a specific device (e.g., an image or video processing system) configured to employ an embodiment of the present invention by further configuration of the processing circuitry by instructions for performing the algorithms and/or operations described herein. The processing circuitry 502 may include, among other things, a clock, an arithmetic logic unit (ALU) and logic gates configured to support operation of the processing circuitry.

The communication interface 504 may be any means such as a device or circuitry embodied in either hardware or a combination of hardware and software that is configured to receive and/or transmit data, including media content in the form of video or image files, one or more audio tracks or the like. In this regard, the communication interface 504 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 6 illustrates an example communication network 600 within which certain illustrative embodiments are to be implemented. However, it is to be appreciated that other embodiments are not limited to the network configurations illustrated herein or otherwise described below. It is to be understood that the elements shown in communication network 600 are intended to represent an example embodiment of a repeater node in communication with two donor nodes. However, any number of donor nodes may be contemplated.

As depicted in FIG. 6, a donor node A may have an associated physical beam channel set 601 and a donor node B may have an associated physical beam channel set 602. The respective physical beam channel set may include one or more physical beam channels 601a-f and 602a-f, respectively. In some embodiments, a physical beam channel is an SSB beam. As illustrated in FIG. 6, in an example embodiment, the physical beam channel set 601 and 602 may have M+N total physical beam channels. A portion of the total physical beam channels from each donor node may be allocated to a repeater node 603. The repeater node 603 may coordinate and/or negotiate with the donor node A and donor node B using a corresponding communication channel which has been established with each donor node (e.g., control and resource allocation and conflict resolution channels 605 and 606, respectively). For example, donor node A may determine to allocate N physical beam channels to the repeater node 603. As such, the physical beam channels 601e to 601f corresponding to physical beam channels M+1 to M+N may be allocated to the repeater node 603. Similarly, donor node B may also determine to allocate N physical beam channels to the repeater node 603. As such, the physical beam channels 602e to 602f corresponding to physical beam channels M+1 to M+N may be allocated to the repeater node 603. The remaining physical beam channels (e.g., physical beam channels 601a-c for donor node A and 602a-c for donor node B) may remain dedicated to the respective donor node such that these physical beam channels continue to serve UEs within the coverage area of the donor node.

The repeater node 603 may coordinate with each donor node to ensure the allocated physical beam channels do not overlap in time or frequency. In an instance one or more physical beam channels from the one or more donor nodes overlap, the repeater node 603 may negotiate with each donor node to avoid the overlap in time or frequency. In some embodiments, in an instance of overlap, the repeater node 603 may allow for the overlap but may ensure the physical beam channel associated with a RACH occasion (RO) remains separated by a RACH configuration.

Once the repeater node 603 has received the allocated 2N physical beam channels, the repeater node 603 may determine a grid of physical repeater beam channels based at least in part on the allocated physical beam channels from the donor nodes. The repeater node 603 may be configured to divide a total access coverage area into a grid with 2N physical beam channels. Each physical beam channel is assigned to a geographic region of the access coverage area. In some embodiments, a repeater node 603 may split the total access coverage area evenly between the physical beam channels. For example, the repeater node may determine a grid of physical repeater beam channels such that physical repeater beam channels associated with physical beam channels from donor node A cover N directions in a portion, such as half, of the access coverage area while physical repeater beam channels associated with physical beam channels from donor node B cover N directions in the other portion, e.g., half, of the access coverage area. The repeater node 603 may map the associated physical beam channel from a donor node to a particular physical repeater beam channel. Additionally, each RO may be mapped to a particular donor node such that the repeater node 603 is aware of the corresponding donor node to which the UE signal is to be provided. The grid of physical repeater beam channels may include one or more configuration parameters for each physical repeater beam channel. The one or more configuration parameters may be indicative of a physical beam channel to which the physical repeater beam channel corresponds, an indication of a corresponding donor node associated with the physical beam channel to which the physical repeater beam channel corresponds, a time slot corresponding to the physical repeater beam channel, and/or the like.

In some embodiments, the repeater schedule may also define an operational pattern configuration within which an access panel and backhaul panel operate for a given time. The operational pattern configuration may include an uplink operational pattern configuration and downlink operational pattern configuration. For example, in one time slot, the repeater schedule may indicate that the access panel and backhaul panel operate in an uplink operational pattern configuration such that only signals corresponding to an uplink pattern are received and/or transmitted. As another example, in another time slot, the repeater schedule may indicate that the access panel and backhaul panel operate in a downlink operational pattern configuration such that only signals corresponding to a downlink pattern are received and/or transmitted. In some embodiments, the repeater schedule may be based at least in part on the configuration parameters for the physical repeater beam channels. As such, the repeater schedule may accommodate the reception of signals from UEs and/or donor nodes and/or the provision of signals to the one or more donor nodes. The repeater node may provide the repeater beam scheduling to one or more donor nodes. In some embodiments, an indication of the repeater beam signaling is provided in the configuration parameters. Signals received by the repeater node which do not correspond to the operational pattern configuration defined by the current time slot may be ignored by the repeater node.

In some embodiments, the repeater schedule may also define a non-overlapping frequency band configuration for each time slot. For example, each time slot may be assigned a particular frequency range within which the signals may be received and/or transmitted. Signals received by the repeater node 703 which are outside of the frequency range may be ignored by the repeater node 703.

FIG. 7 illustrates messages exchanged between donor nodes, a repeater node, and UEs for the allocation and provision of physical beam channels by the one or more donor nodes to the repeater node. As will be discussed herein, two UE's and two donor nodes are discussed. However, it should be appreciated that any number of UE's and donor nodes, may be contemplated.

In operation 1 of FIG. 7, donor node A 701 may provide an indication of resource information to repeater node 703. In some embodiments, the indication of resource information may include a number of physical beam channels that the donor node may allocate to the repeater node 703, as denoted by the SSB_ids available. In some embodiments, the indication of resource information includes a maximum number of physical beam channels that the donor node may allocate. For example, if a donor node determines it may allocate between one to four physical beam channels to repeater node 703, the indication of resource information may describe a maximum of four physical beam channels that may be allocated to the repeater node 703. In some embodiments, the resources information may include an indication of the specific physical beam channels that can be allocated to the repeater node. For example, the resource information may include a physical beam channel identifier for each available physical beam channel. The physical beam channel identifier may uniquely identify the physical beam channel from one or more other physical beam channels within the physical beam channel set.

Once the repeater node 703 receives the indication of resource information from donor node A 701, the repeater node 701 may establish a control channel with donor node A. In some embodiments, the control channel is a control and resource allocation and conflict resolution channel. In some embodiments, the repeater node 703 may establish a control channel with donor node A prior to reception of the indication of resource information.

In operation 2 of FIG. 7, donor node B 702 may provide an indication of resource information to repeater node 703. This operation may be substantially the same as operation 1 of FIG. 7. Repeater node 703 may similarly establish a control channel with donor node B upon receipt of the indication of resource information. In some embodiments, the control channel is a control and resource allocation and conflict resolution channel. In some embodiments, the repeater node 703 may establish a control channel with donor node B prior to reception of the indication of resource information.

In some embodiments, once the repeater node 703 receives the indication of resource information from donor node A 701 and/or donor node B 702, the repeater node may determine a grid of physical repeater beam channels to cover an access area based at least in part on the received indication of resource information from the donor nodes. Each physical repeater beam channel may be associated with a particular physical beam channel. For example, both donor node A 701 and donor node B 702 may allocate four physical beam channels to repeater node 703. In response, repeater node 703 may determine a grid of eight physical repeater beam channels (e.g., physical repeater beam channels 1-8), with four physical repeater beam channels corresponding to four physical beam channels from donor node A 701 and four physical repeater beam channels corresponding to four physical beam channels from donor node B 702.

In operation 3 and operation 4 of FIG. 7, repeater node 703 may provide an indication of the grid of physical repeater beam channels to donor node A 701 and donor node B 702. The indication of the grid of physical repeater beam channels may include at least one or more configuration parameters associated with the physical repeater beam channels which correspond to the particular donor node, as denoted by the SSB_id assignment. For example, the indication of the grid of physical repeater beam channels provided to donor node A may include the configuration parameters for the four physical repeater beam channels pertaining to the four physical beam channels from donor node A. In some embodiments, the repeater node 703 may also provide an indication of an associated repeater schedule.

In some embodiments, the indication of the grid of physical repeater beam channels may also include one or more configuration parameters associated with the physical repeater beam channels which corresponds to one or more additional donor nodes. For example, the indication of the grid of physical repeater beam channels provided to donor node A may include the configuration parameters for the four physical repeater beam channels pertaining to the four physical beam channels from donor node A as well as the four physical repeater beam channels pertaining to the four physical beam channels from donor node B. As such, each donor node may be informed of the assignment of one or more other donor nodes, which may assist with the donor node configuration of one or more physical beam channels not allocated to the repeater node. For example, donor node A 701 may determine to not use a particular physical beam channel at the same time as a physical repeater beam channel corresponding to a donor node B 702 is used by the repeater node if the physical beam channel overlaps with the physical beam channel. As such, this may avoid beam interference between a donor node and a repeater node using a physical repeater beam channel corresponding to a different donor node.

In operations 5*a-d* and 7*a-d* of FIG. 7, donor node A 701 and donor node B 702 may provide respective physical beam channels to the repeater node 703. In some embodiments, the one or more physical beam channels each correspond to a particular SSB identifier (SSB_id). An SSB_id may uniquely identify the physical beam channel and corresponding donor node. For example, an SSB_id A1 may be indicate a first physical beam channel of donor node A 701. The donor node A 701 and donor node B 702 may provide each respective physical beam channel to the repeater node 703 in accordance with the one or more configuration parameters. In some embodiments, the one or more physical beam channels may be provided simultaneously. In some embodiments, the one or more physical beam channels may be provided at separate times. For examples, the physical beam channel corresponding to operation 5*a* may be provided to repeater node 703 at a first time slot, the physical beam channel corresponding to operation 5*b* may be provided to repeater node 702 at a second time slot, and so forth.

In operations 6*a-d* and 8*a-d* of FIG. 7, the repeater node 703 may provide one or more physical repeater beam channels to an associated access area as determined by the grid of physical repeater beam channels. The repeater node 703 may provide the one or more physical repeater beam channels to the associated access area when a corresponding physical beam channel is received by the repeater node 703 on its backhaul side, such that the repeater node 703 may amplify and retransmit the physical beam channel as a physical repeater beam channel on its access side.

In operations 9*a-d* and 11*a-d* of FIG. 7, UE A 704 and UE B 705 may respectively receive the one or more physical repeater beam channels and determine which uplink physical repeater beam channel is associated with the strongest signal. The one or more physical beam channels received by each UE may be dependent upon the particular area within the access area where the UE is located. Both UE A 704 and UE B 705 may receive the one or more physical repeater beam channels 9*a-d* and 11*a-d*, respectively. Each UE may then determine which uplink physical repeater beam channel is associated with the strongest signal. UE A 704 may determine the uplink physical repeater beam channel 3 (9*c*) is associated with the strongest physical repeater beam signal 6*c* while UE B 705 may determine the uplink physical repeater beam channel 6 (11*b*) is associated with the strongest physical repeater beam signal 8*b*. The physical repeater beam channel associated with the uplink physical repeater beam channel which a UE detects as associated with the strongest signal is denoted by a solid line while the other physical repeater beam channels are denoted by dashed lines. The UE may then provide a physical random access channel (PRACH) to the repeater node 703 using a RACH occasion (RO) which is associated with the physical repeater beam channel. In some embodiments, the one or more RO each correspond to a particular RO identifier. An RO may uniquely identify the physical beam channel and the corresponding donor node corresponding to the RO. For example, an RO A1 may be indicate the RO is associated with a first physical beam channel of donor node A 701.

In operations 10*a-d* and 12*a-d* of FIG. 7, the repeater node 703 may provide a backhaul physical beam channel to donor node A 701 and donor node B 702, respectively. The repeater node 703 may forward the PRACH to the donor node associated with the physical repeater beam channel that is associated with the RO for the UE 704 and UE B 705. For instance, the RO for UE A 704 may be associated with physical repeater beam channel 3 which corresponds to donor node A 701. As such, the repeater node 703 may provide the PRACH to donor node A 701 using a backhaul physical beam channel.

In some embodiments, a repeater node may be configured with one or more backhaul panels and/or access panels, each configured with one or more transmitters and/or receivers. Depending on the type of one or more backhaul panels and/or access panels with which the repeater node is configured, the repeater node may be configured to support time domain multiplexing (TDM), spatial domain multiplexing (SDM), and/or frequency domain multiplexing (FDM). For example, if a repeater node is configured with one backhaul panel which may only receive one physical beam channel and/or transmit one backhaul physical beam channel at a time, the repeater node may be restricted to TDM such that only one physical beam channel or RO is received and/or only one backhaul physical beam channel or physical repeater beam channel is transmitted at a time. As another example, if the repeater node is configured with a backhaul panel capable of receiving one or more physical beam channels and/or transmitting one or more backhaul physical beam channels at a time and/or configured with one or more access panels capable of providing one or more physical repeater beam channels and receiving one or more ROs, the repeater node may operate in SDM such that physical beam channels or ROs may be received simultaneously and backhaul physical beam channels or physical repeater beam channels may be transmitted simultaneously.

A repeater node that is configured for TDM may need to schedule the use of its backhaul panel and/or access panel between the one or more donor nodes as the repeater node may not be configured to receive physical beam channels simultaneously. As such, the direction of the backhaul panel and/or backhaul beams may determine which donor nodes from which the repeater node is capable of receiving physical beam channels as well as which donor nodes to which the repeater node is capable of transmitting backhaul physical beam channels. Similarly, the direction of the access panel may determine which UEs from which the repeater node is capable of receiving ROs as well as which UEs to which the repeater node is capable of transmitting physical repeater beam channels. Therefore, a repeater schedule may be determined for repeater nodes operating in TDM. In some embodiments, the repeater schedule may be determined by the repeater node and indicated to the one or more donor nodes by the one or more configuration parameters of the indication of physical repeater beam channels.

In some embodiments, the one or more donor nodes associated with the repeater node may establish a control channel with one another to coordinate repeater resource usage. In some embodiments, the control channel may be an Xn interface between two or more donor nodes. Once the donor nodes have coordinated with one another to determine a resource allocation, at least one of the donor nodes may provide the repeater node of the decision of the two or more donor nodes. The repeater node may then determine a repeater schedule based at least in part on the indication of resource allocation as decided between the two or more donor nodes.

FIG. 8 illustrates messages exchanged between donor nodes, a repeater node, and UEs for the allocation of backhaul physical beam channel for use by different donor nodes when the repeater node is operating in TDM. As will be discussed herein, two UE's and two donor nodes are discussed. However, it should be appreciated that any number of UE's and donor nodes, may be contemplated.

In operation 1 of FIG. 8, a donor node A 701 may provide a physical channel request message (e.g., a physical downlink control channel (PDCCH), a physical downlink shared channel (PDSCH), channel state information reference signal (CSI-RS), physical uplink shared channel (PUSCH), physical uplink control channel (PUCCH), sounding reference signal (SRS), etc. as well as a required duration in symbols and/or slots) to the repeater node 703. The repeater node 703 may receive the physical channel request message via a physical beam channel when backhaul panel and/or backhaul beam of the repeater node 703 is pointing in the direction of the donor node A 701.

In operation 2 of FIG. 8, a donor node B 702 may also provide a physical channel request message to the repeater node 703. The repeater node 703 may receive the physical channel request message via a physical beam channel when backhaul panel and/or backhaul beam of the repeater node 703 is pointing in the direction of the donor node B 702. This requires the backhaul physical beam channel of the repeater node 703 to be shifted in the spatial direction of donor node B 702.

The repeater node 703 may aggregate the requests from donor node A 701 and donor node B 702 to generate a repeater schedule. In some embodiments, this may be performed simultaneously with the determination of the grid of physical repeater beam channels. The repeater node 703 may allocate the repeater schedule and/or grid of physical repeater beams for the one or more donor nodes based at least in part on the respective traffic volume and/or quality of service (QOS) criteria for each of the one or more donor nodes. The repeater node 703 may include guard intervals in the repeater schedule to allow for consideration of, for example, switching delays between the one or more donor nodes, propagation delay constraints due to the distance between donor nodes, any RF hardware limitations, etc.

In operation 3 of FIG. 8, a repeater node 703 may provide donor node A 701 with an indication of the grid of physical repeater beam channels and the repeater schedule. In some embodiments, the repeater node 703 may provide an indication of the repeater schedule in the one or more configuration parameters of the indication of the grid of physical repeater beam channels. Prior to providing donor node A 701 with the repeater schedule, the direction of the backhaul beam of repeater node 703, which may be currently pointing in the direction of donor node B 702, may be switched to spatially point to donor node A 701. As such, the backhaul panel and/or backhaul beam may change spatial direction such that the backhaul physical beam channel from the repeater node 703 may be provided to donor node A 701 and not donor node B 702. The backhaul panel and/or backhaul beam may switch the direction to which it points based at least in part on the repeater schedule.

In operation 4 of FIG. 8, a repeater node 703 may provide donor node B 702 with a repeater schedule. Prior to providing donor node B 702 with the repeater schedule, the direction the backhaul panel and/or backhaul beam of repeater node 703, which may be currently pointing in the direction of donor node A 701, may be switched to point to donor node B 702. As such, the backhaul panel and/or backhaul beam may change spatial direction such that the backhaul physical beam channel from the repeater node 703 may be provided to donor node B 702 and not donor node A 701.

In operation 5 of FIG. 8, the donor node A 701 may provide the repeater node 703 with a downlink physical channel. This provision of the downlink channel by donor node A 701 may be provided in accordance with the repeater schedule of repeater node 703. As such, repeater node 703 may receive the downlink physical channel from the donor node A 701.

In operation 6 of FIG. 8, the repeater node 703 may relay the downlink physical channel to the corresponding UE A 704 using the physical repeater beam channel associated with UE A 704. In some embodiments, an associated access panel configured to provide the physical repeater beam channel to a UE may be pointed in the spatial direction as indicated by the one or more configuration parameters as described by the grid of physical repeater beam channels and the repeater schedule.

In operation 7 of FIG. 8, the donor node B 702 may provide the repeater node 703 with a downlink physical channel. This provision of the downlink channel by donor node B 702 may be provided in accordance with the repeater schedule of repeater node 703. As such, repeater node 703 may receive the downlink physical channel from the donor node B 702.

In operation 8 of FIG. 8, the repeater node 703 may relay the downlink physical channel to the corresponding UE B 705 using the physical repeater beam channel associated with UE B 705. In some embodiments, an associated access panel configured to provide the physical repeater beam channel to a UE may be pointed in the spatial direction as indicated by the one or more configuration parameters as described by the grid of physical repeater beam channels and the repeater schedule. For example, the access panel may initially be configured to point to the UE A 704 and may thus be moved such that the access panel is configured to point to the UE B 705.

In operation 9 of FIG. 8, UE A 704 may provide the repeater node 703 with an uplink physical channel. The repeater node 703 may spatially configure an associated access panel in the direction of UE A 704 such that the repeater node 703 may receive the uplink physical channel from the UE A 704. In some embodiments, an associated access panel configured to provide the physical repeater beam channel to a UE may be pointed in the spatial direction as indicated by the one or more configuration parameters as described by the grid of physical repeater beam channels.

In operation 10 of FIG. 8, the repeater node 703 may relay the uplink physical channel to corresponding donor node A 701 using the backhaul physical repeater beam channel. The repeater node 703 may relay the uplink physical channel to donor node A 701 as this is the donor node from which the UE has detected the strongest uplink physical repeater beam channel. The backhaul physical repeater beam channel may provide the uplink physical channel to donor node A 701 using the backhaul panel of the repeater node 703. The repeater node 703 may follow the repeater schedule.

In operation 10 of FIG. 8, UE B 705 may provide the repeater node 703 with an uplink physical channel. The repeater node 703 may spatially configure an associated access panel in the direction of UE B 705 such that the repeater node 703 may receive the uplink physical channel from the UE B 705. In some embodiments, an associated access panel configured to provide the physical repeater beam channel to a UE may be pointed in the spatial direction as indicated by the one or more configuration parameters as described by the grid of physical repeater beam channels.

In operation 12 of FIG. 8, the repeater node 703 may relay the uplink physical channel to corresponding donor node B 702 using the backhaul physical repeater beam channel. The repeater node 703 may relay the uplink physical channel to donor node B 702 as this is the donor node from which the UE has detected the strongest uplink physical repeater beam channel. The backhaul physical repeater beam channel may provide the uplink physical channel to donor node B 702 using the backhaul panel of the repeater node 703. The repeater node 703 may follow the repeater schedule.

FIG. 9 illustrates messages exchanged between donor nodes, a repeater node, and UEs for the allocation of a backhaul physical beam channel for use by different donor nodes when the repeater node is operating in SDM. As will be discussed herein, two UE's and two donor nodes are discussed. However, it should be appreciated that any number of UE's and donor nodes, may be contemplated.

In operations 1 and 2 of FIG. 9, a donor node A 701 and donor node B 702 may provide a physical channel request message (e.g., a physical downlink control channel (PDCCH), a physical downlink shared channel (PDSCH), channel state information reference signal (CSI-RS), physical uplink shared channel (PUSCH), physical uplink control channel (PUCCH), sounding reference signal (SRS), etc. as well as a required duration in symbols and/or slots) to the repeater node 703. The donor node A 701 and donor node B 702 may provide the physical channel request message simultaneously. In contrast to a repeater node 703 which operates using TDM, a repeater node 703 operating using SDM may have a backhaul panel capable of simultaneously receiving messages from one or more donor nodes and/or may have one or more receivers.

Once the repeater node 703 simultaneously receives the requests from donor node A 701 and donor node B 702, the repeater node 703 may generate a repeater schedule. In some embodiments, this may be performed simultaneously with the determination of the grid of physical repeater beam channels. In some embodiments, the repeater schedule may describe an enforceable directional pattern allowable for all donor nodes. In particular, the repeater schedule may define an operational pattern configuration within which an access panel and backhaul panel operate for a given time. The operational pattern configuration may include an uplink operational pattern configuration and downlink operational pattern configuration. For example, in one time slot, the repeater schedule may indicate the access panel and backhaul panel operate in an uplink operational pattern configuration such that only signals corresponding to an uplink pattern are received and/or transmitted. As another example, in another time slot, the repeater schedule may indicate the access panel and backhaul panel operate in a downlink operational pattern configuration such that only signals corresponding to a downlink pattern are received and/or transmitted. In some embodiments, the repeater schedule may be based at least in part on the configuration parameters for the physical repeater beam channels. As such, the repeater schedule may accommodate the reception of signals from UEs and/or donor nodes and/or the provision of signals to the one or more donor nodes. The repeater node may provide the repeater beam scheduling to one or more donor nodes. In some embodiments, an indication of the repeater beam signaling is provided in the configuration parameters. As such, the repeater node 703 may operate with a specific operational pattern configuration (e.g., either uplink operational pattern configuration or downlink operational pattern configuration).

In operations 3 and 4 of FIG. 9, a repeater node 703 may provide donor node A 701 and donor node B 702 with a repeater schedule simultaneously. Prior to providing the repeater schedule to the donor nodes, the repeater node 703 may ensure that the current time slot is either for the downlink or for the uplink operation pattern configuration.

In operations 5 and 7 of FIG. 9, donor node A 701 and donor node B 702 may each provide the repeater node 703 with a downlink physical channel, which the repeater node 703 may receive simultaneously. The donor nodes may provide the downlink physical channel to the repeater node 703 according to when the repeater node 703 is within a time slot for the downlink operation pattern configuration.

In operations 6 and 8 of FIG. 9, the repeater node 703 may relay the downlink physical channel to the corresponding UE A 704 and UE B 705 using the physical repeater beam channel associated with UE A 704 and the physical repeater beam channel associated with UE B 705 simultaneously. In some embodiments, an associated access panel configured to provide the physical repeater beam channel to a UE may be configured to operate two or more physical repeater beam channels simultaneously to provide one or more UEs which may be in different access areas with a physical repeater beam channel simultaneously. During this time slot, the repeater node 703 may be operating in the downlink operational pattern configuration.

In operations 9 and 11 of FIG. 9, the repeater node 703 may relay the downlink physical channel to the corresponding UE A 704 and UE B 705 using the physical repeater beam channel associated with UE A 704 and the physical repeater beam channel associated with UE B 705 simultaneously. In some embodiments, an associated access panel configured to provide the physical repeater beam channel to a UE may be configured to operate two or more physical repeater beam channels simultaneously to provide one or more UEs which may be in different access areas with a physical repeater beam channel simultaneously.

In operations 10 and 12 of FIG. 9, the repeater node 703 may relay the uplink physical channel to corresponding donor node A 701 and donor node B 702 using the corresponding backhaul physical repeater beam channel simultaneously. During this time slot, the repeater node 703 may be operating in the uplink operational pattern configuration.

Although each donor node may allocate a number of physical beam channels to the repeater node, the traffic load for each donor node may change with time. As such, in order to effectively serve the UEs within the donor node access area, the donor node may require one or more of its physical beam channels currently allocated to the repeater node to be reallocated to serve the one or more UEs within the donor node access area. Additionally or alternatively, each donor node may be configured with a different number of physical beam channels and therefore the allocation of resources between donor nodes may not be equally shared. Donor nodes with fewer physical beam channels are more susceptible to becoming overloaded with data traffic when one or more of their physical beam channels are allocated to the repeater node. Therefore, it may be advantageous to consider the traffic load for each donor node and allow renegotiation for allocation of physical beam channel resources from donor nodes associated with the repeater node over time. As such, donor nodes with high traffic loads may be able to renegotiate with the repeater node and in turn, the repeater node may be able to negotiate with one or more other donor nodes for one or more additional physical beam channels and/or update a grid of physical repeater beam channels and configuration parameters to accommodate traffic load balancing.

FIG. 10 illustrates messages exchanged between donor nodes, a repeater node, and UEs for balancing traffic loads between donor nodes. As will be discussed herein, two UE's and two donor nodes are discussed. However, it should be appreciated that any number of UE's and donor nodes, may be contemplated.

In operations 1a-d and 3a-d of FIG. 10, donor node A 701 and donor node B 702 may provide respective physical beam channels to the repeater node 703. For example, both donor node A 701 and donor node B 702 may allocate four physical beam channels to repeater node 703. As such, repeater node 702 may have eight physical beam channels, and may denote each physical beam channel with a unique identifier (e.g., physical beam channel 1-8). This operation may be substantially similar to operations 5a-d and 7a-d as described in FIG. 7.

In operations 2a-d and 4a-d of FIG. 10, the repeater node 703 may provide one or more physical repeater beam channels to an associated access area as determined by the grid of physical repeater beam channels. The repeater node 703 may provide the one or more physical repeater beam channels to the associated access area when a corresponding physical beam channel is received by the repeater node 703 on its backhaul side, such that the repeater node 703 may amplify and retransmit the physical beam channel as a physical repeater beam channel on its access side. This operation may be substantially similar to operations 6a-d and 8a-d as described in FIG. 7.

In operation 5 of FIG. 10, donor node A 701 may provide a load rebalancing request to repeater node 703. Donor node A may request the traffic load rebalancing request in an instance the donor node A does not have sufficient resources to accommodate the current traffic load it is currently serving in its associated access area. As such, donor node A 701 may determine that it needs one or more of its physical beam channels currently allocated to the repeater node 703 to serve UEs within its associated access area. In some embodiments, the donor node A may provide an indication of the number of physical beam channels it is still capable of allocating to the repeater node 703 during the load rebalancing request. For example, donor node A may indicate it can only allocate two physical beam channels to repeater node 703 rather than the four physical beam channels that are currently allocated to the repeater node 703.

In operation 6 of FIG. 10, repeater node 703 may request one or more additional physical beam channels from donor node B. In some embodiments, the repeater node 703 may request the one or more additional physical beam channels from donor node B using the control and resource allocation and conflict resolution channel established between repeater node 703 and donor node B. In some embodiments, the repeater node 703 may request at least as many physical beam channels from donor node B as lost from donor node A. For example, repeater node 703 may request at least two physical beam channels from donor node B.

In operation 7 of FIG. 10, donor node B 702 may provide an additional physical beam channel response to the repeater node 703. The additional physical beam channel response may include one or more additional physical beam channels from donor node B that can be allocated to repeater node 703. For example, donor node B 702 may determine it can allocate an additional two physical beam channels to repeater node 703. The repeater node 703 may then update the grid of physical repeater beam channels based at least in part on the additional physical beam channels received from donor node B 702. Although donor node B 702 has allocated the requested two physical beam channels, donor node B 702 need not allocate the full requested amount of physical beam channels as requested by repeater node 703.

In operation 8 of FIG. 10, the repeater node 703 may provide an indication of the updated grid of physical repeater beam channels to donor node A 701. The indication of the grid of physical repeater beam channels may include at least one or more configuration parameters associated with the physical repeater beam channels which correspond to the particular donor node after updating. For example, the indication of the grid of physical repeater beam channels provided to donor node A may include the configuration parameters for the two physical repeater beam channels pertaining to the two physical beam channels from donor node A.

In operation 9 of FIG. 10, the repeater node 703 may provide an indication of the updated grid of physical repeater beam channels to donor node B 702. The indication of the grid of physical repeater beam channels may include at least one or more configuration parameters associated with the physical repeater beam channels which correspond to the particular donor node after updating. For example, the indication of the grid of physical repeater beam channels provided to donor node B may include the configuration parameters for the six physical repeater beam channels pertaining to the six physical beam channels from donor node B.

In operations 10a-b and 12a-f of FIG. 10, donor node A 701 and donor node B 702 may provide respective physical beam channels to the repeater node 703. For example, donor node A 701 may allocate two physical beam channels to repeater node 703 while donor node B 702 allocates six physical beam channels to repeater node 703. As such, repeater node 702 may have eight physical beam channels, and may denote each physical beam channel with a unique identifier (e.g., physical beam channel 1-8). Although the physical beam channels have been reallocated by the repeater node 703, the number of physical beam channels has remained the same. However, the number of physical beam channels may increase and/or decrease during reallocation.

In operations 11a-b and 13a-f of FIG. 10, the repeater node 703 may provide one or more physical repeater beam channels to an associated access area as determined by the grid of physical repeater beam channels. The repeater node 703 may provide the one or more physical repeater beam channels to the associated access area when a corresponding physical beam channel is received by the repeater node 703 on its backhaul side, such that the repeater node 703 may amplify and retransmit the physical beam channel as a physical repeater beam channel on its access side.

A donor node may experience a link failure such that the repeater node may no longer be provided with the one or more physical beam channels from the donor node. In conventional systems, this would result in a failure on the repeater node as well, as the repeater node relies on a single donor node to provide the one or more physical beam channels. In certain embodiments of the present invention however, the repeater node may advantageously still be connected to one or more other donor nodes in an instance a donor node experiences a link failure and additionally, may request one or more additional physical link channels from the remaining one or more donor nodes. As such, the repeater node may update the associated grid of physical repeater beam channels and continue serving the one or more UEs within its access area. Additionally, the one or more UEs that were served by the failing donor node will re-attach to the working donor node such that they may continue to be served by a working donor node via the repeater node.

FIG. 11 illustrates messages exchanged between donor nodes, a repeater node, and UEs for updating a grid of physical repeater beams in an instance a donor node experiences a link failure. As will be discussed herein, two UE's and two donor nodes are discussed. However, it should be appreciated that any number of UE's and donor nodes, may be contemplated.

In operation 1 of FIG. 11, donor node A 701 may experience a link failure condition and may inform the repeater node 703 of the link failure condition. The link failure condition may be associated with donor node A 701 or may be a failure condition associated with an upstream donor node from donor node A 701. For example, a link failure may occur when a donor node experiences a network connection outage, when a signal towards a donor node becomes blocked by one or more obstacles, due to changing interface conditions, or becomes weak due to distance between the donor node and the repeater node. In some embodiments, link failure may be determined by the repeater node 703 when a received signal from a donor node does not satisfy one or more signal thresholds. As another example, a donor node, such as an IAB node which is reliant on a parent donor node may experience a link failure in an instance the parent donor node suffers a link failure.

In operation 2 of FIG. 11, the repeater node 703 instructs donor node A 701 to stop all transmissions. The repeater node 703 may also update a grid of physical repeater beam channels using only the available physical beam channels as provided by donor node B 702. The repeater node 703 may update the grid of physical repeater beam channels such that coverage area served by each physical repeater beam channel is expanded. The repeater node 703 may ensure the grid of physical repeater beam channels still covers the full access area by re-arranging the physical repeater beam channels of the grid of physical beam channels. This may require each physical repeater beam channel to increase in width to accommodate coverage of a larger portion of the access area. The repeater node 703 may also update one or more configuration parameters associated with the grid of physical repeater beam channels.

In operations 3a-3d, donor node B may provide the respective physical beam channels to the repeater node 703. Donor node B 702 may provide each respective physical beam channel to the repeater node 703 in accordance with the one or more configuration parameters. Although repeater node 703 has updated a grid of physical repeater beam channels, this may not affect the configuration and/or operation of donor node B 702 such that the previous configuration parameters of donor node B 702 are still valid. In some embodiments, the repeater node 703 may provide an indication of the grid of physical repeater beam channels to donor node B 703 such that donor node B 703 is aware of the update. Additionally, although not shown, in some embodiments, the repeater node 703 may request one or more additional physical beam channels from donor node B 703.

In operations 4a-c of FIG. 11, the repeater node 703 may provide the one or more physical repeater beam channels to an associated access area as determined by the grid of physical repeater beam channels. The physical repeater beam channels are provided using the updated grid of physical repeater beam channels. As such, the physical repeater beam channels may cover a relatively larger access portion than previously when physical repeater beam channels associated with donor node A 701 were used. However, the physical repeater beam channels may still cover the entirety of the access area and therefore serve the UEs within the access area, including those UEs previously served by donor node A 701.

In operations 5a-c of FIG. 11, UE A 704 and UE B 705 may respectively receive the one or more physical repeater beam channels and determine which uplink physical repeater beam channel is associated with the strongest signal. The one or more physical beam channels received by each UE may be dependent upon the particular area within the access are where the UE is located. UE A 704 may determine the physical repeater beam channel 4 (e.g., 4d) is associated with the uplink physical repeater beam channel detected as the strongest signal while UE B 705 may determine the physical repeater beam channel 2 (e.g., 4) is associated with the uplink physical repeater beam channel detected as the strongest signal. The UE may then provide a PRACH to the repeater node 703 using a RACH occasion (RO) which is associated with the physical repeater beam channel (e.g., RO for physical repeater beam channel 4 and RO for physical repeater beam channel 2, respectively).

In operations 6a-d of FIG. 11, the repeater node 703 may provide one or more backhaul physical beam channels to donor node B 702. The repeater node 703 may forward the PRACH to the donor node corresponding to the physical beam channel associated with the physical repeater beam channel that is associated with the RO for the UE A 704 and UE B 705. In this particular instance, the physical repeater beam channels correspond to donor node B 702 so all backhaul physical beam channels are provided to donor node B 702.

In some embodiments, a mobile repeater node may be contemplated. For example, a mobile repeater node may be attached to a vehicle (e.g., car, bus, train, etc.) such that it is capable of serving at least the one or more users within the vehicle. Previously, conventional repeaters could not be efficiently used for such mobility purposes as their reliance on a single donor node would require at least a transition period during which the repeater node must switch from an initial donor node no longer in range to a new donor node in range. However, during this transition period, the repeater node is not capable of serving the UEs within its access area. Certain embodiments of the present invention advantageously allow for the repeater node to use one or more donor nodes. As such, the repeater node may detect the presence of new donor nodes, establish a control channel with the new donor nodes, and receive physical beam channels from the new donor nodes prior to experiencing a link failure with the original donor node due to moving out of range of the original donor node. As such, the repeater node may continue serving the UEs within its access area using the physical beam channels as provided by the one or more new donor nodes.

FIG. 12 illustrates messages exchanged between donor nodes, a repeater node, and UEs for updating a grid of physical repeater beams in an instance a repeater node is mobile. As will be discussed herein, two UE's and two donor nodes are discussed. However, it should be appreciated that any number of UE's and donor nodes, may be contemplated.

In operations 1a-d of FIG. 12, donor node A 701 may provide respective physical beam channels to the repeater node 703. Donor node A 701 may provide each respective physical beam channel to the repeater node 703 in accordance with the one or more configuration parameters.

In operations 2a-d of FIG. 12, the repeater node 703 may provide one or more physical repeater beam channels to an associated access area as determined by the grid of physical repeater beam channels. The repeater node 703 may provide the one or more physical repeater beam channels to the associated access area when a corresponding physical beam channel is received by the repeater node 703 on its backhaul side, such that the repeater node 703 may amplify and retransmit the physical beam channel as a physical repeater beam channel on its access side.

During this time or at a later time, the repeater node 703 may also perform a backhaul beam sweep using its backhaul panel to detect one or more additional donor nodes. The backhaul beam sweep may detect one or more additional donor nodes, such as donor node B. If a detected donor node has a strong enough signal strength, the donor node is selected as a new donor node. In some embodiments, the signal strength of the detected donor node is compared to a reference signal received power (RSRP) and the RSRP is used to determine whether the signal strength from the detected donor node is sufficiently strong. The repeater node 703 may determine that the signal strength from donor node B 702 is sufficiently strong.

In operation 3 of FIG. 12, the repeater node 703 may establish a control channel with donor node B. In some embodiments, the control channel is a control and resource allocation and conflict resolution channel. The repeater node 703 may also request an indication of resource information from donor node B 702. The request for an indication of resource information may include a request for a maximum number of physical beam channels from donor node B 702.

In operation 4 of FIG. 12, donor node B may provide an indication of resource information to repeater node 703. In some embodiments, the indication of resource information may include a number of physical beam channels that the donor node may allocate to the repeater node 703. In some embodiments, the indication of resource information includes a maximum number of physical beam channels that the donor node may allocate. For example, if a donor node determines it may allocate between one to four physical beam channels to repeater node 703, the indication of resource information may describe a maximum of four physical beam channels that may be allocated to the repeater node 703. In some embodiments, the resource information may include an indication of the specific physical beam channels that can be allocated to the repeater node. For example, the resource information may include a physical beam channel identifier for each available physical beam channel. The physical beam channel identifier may uniquely identify the physical beam channel from one or more other physical beam channels within the physical beam channel set.

Repeater node 703 may update a grid of physical repeater beam channels based at least in part on the received indication of resource information from donor node B 702. For example, the repeater node 703 may update the coverage area for each physical repeater beam channel based on the physical beam channels from both donor node A 701 and donor node B 702. In some embodiments, repeater node 703 may provide an indication of the updated grid of physical repeater beam channels to donor node A 701 and/or donor node B 702.

In operations 5a-d and 7a-d of FIG. 12, donor node A 701 and donor node B 702 may provide respective physical beam channels to the repeater node 703. The donor node A 701 and donor node B 702 may provide each respective physical beam channel to the repeater node 703 in accordance with the one or more configuration parameters. In some embodiments, the one or more physical beam channels may be provided simultaneously.

In operations 6a-d and 8a-d of FIG. 12, the repeater node 703 may provide one or more physical repeater beam channels to an associated access area as determined by the grid of physical repeater beam channels. The repeater node 703 may provide the one or more physical repeater beam channels to the associated access area when a corresponding physical beam channel is received by the repeater node 703 on its backhaul side, such that the repeater node 703 may amplify and retransmit the physical beam channel as a physical repeater beam channel on its access side.

UE A 704 may now determine physical repeater beam channel 4 (e.g., 8b) is associated with the uplink physical repeater beam channel detected as the strongest signal and as such, may switch to being served by donor node B 704.

As the repeater node 703 continues to travel, the repeater node 703 may move away from donor node A 701 such that the signal strength of donor node A 701 is no longer sufficient. As such, repeater node 703 may update the grid of physical repeater beam channels to only include physical beam channels from donor node B 702. The operations of FIG. 12 may be performed iteratively as the repeater node 703 continues to travel. As such, the repeater node 703 may continuously or repeatedly perform backhaul beam sweeping and discover new donor nodes with sufficient signal strength that the repeater node 703 may request one or more physical beam channels from the new donor nodes. As such, the repeater node 703 may continuously serve the UEs within its access area while mobile.

FIG. 13 illustrates an example communication network 1300 within which certain illustrative embodiments are to be implemented. However, it is to be appreciated that embodiments are not limited to the network configurations illustrated herein or otherwise described below. It is to be understood that the elements shown in communication system 300 are intended to represent an example embodiment of a repeater node in communication with two donor nodes and two UEs. However, any number of UEs and donor nodes may be contemplated.

As depicted in FIG. 13, a repeater node 1303 is shown which is capable of supporting a plurality of donor nodes 301a-301b. In some embodiments, the repeater node 1303 may be capable of generating its own physical repeater beam channels. The repeater node 1303 may use the provided physical beam channels from donor nodes. The repeater node 1303 may communicate with donor node A and donor node B using its one or more backhaul physical beam channels 1315 and 1320. A donor node A may have an associated physical beam channel set 601 and a donor node B may have an associated physical beam channel set 602. The respective physical beam channel set may include one or more physical beam channels 601a-e and 602a-e, respectively. In some embodiments, a physical beam channel is an SSB beam. The repeater node 1303 may coordinate and/or negotiate with the donor node A and donor node B using a corresponding communication channel which has been established with each donor node, such as control and resource allocation and conflict resolution channels 605 and 606, respectively. For example, donor node A may determine to allocate one physical beam channel to the repeater node 1303. As such, the physical resource channels 601*d* may be allocated to the repeater node 1303. Similarly, donor node B may also determine to allocate one or more physical beam channels to the repeater node 1303. As such, the physical resource channel 602*d* may be allocated to the repeater node 603. The remaining physical beam may remain dedicated to the respective donor node such that these physical beam channels continue to serve UEs within the coverage area of the donor node.

The repeater node 1303 may use the physical beam channel from donor node A to generate one or more physical repeater beam channels 1301*a-b*, which may include N physical repeater beam channels. Similarly, repeater node 1303 may use the physical beam channel from donor node B to generate one or more physical repeater beam channels 1301*c-d*, which may include N physical repeater beam channels. As such, repeater node 1303 may generate one or more physical repeater beams from at least one physical beam channel as supplied by a donor node.

Referring now to FIG. 14, an example flowchart 1400 is depicted that is implemented, for example, by an apparatus 1400 embodied by a network entity, such as repeater node 703.

At block 1401, the apparatus 500 embodied by a network entity, such as repeater node 703, may include means, such as the processing circuitry 502, the communication interface 504, or the like, for detecting one or more donor nodes. In some embodiments, the repeater node 703 may detect the one or more donor nodes by performing a backhaul beam sweep using its backhaul panel to detect one or more donor nodes. If a detected donor node has a strong enough signal strength, the donor node is selected as a new donor node that may serve the repeater node 703. In some embodiments, the signal strength of the detected donor node is compared to a reference signal received power (RSRP) and the RSRP is used to determine whether the signal strength from the detected donor node is sufficiently strong.

At block 1402, the apparatus 500 embodied by a network entity, such as repeater node 703, may include means, such as the processing circuitry 502, the communication interface 504, the memory 506 or the like, for establishing one or more control channels with each of the one or more donor nodes. Once the repeater node 702 has detected one or more donor nodes, the repeater node 702 may establish a control channel with each detected donor node with sufficient signal strength. In some embodiments, the control channel is a control and resource allocation and conflict resolution channel. During establishment of the control channel with each donor node, the control channel of an example embodiment may also be configured to operation in TDM, FDM, or SDM. The mode with which the control channel is configured to operate may be based at least in part on the hardware specification (e.g., the backhaul panel and/or access panel) of the repeater node 703. In some embodiments, the repeater node may also provide an indication of its signal repetition capability or beamforming capability to the one or more donor nodes.

At block 1403, the apparatus 500 embodied by a network entity, such as repeater node 703, may include means, such as the processing circuitry 502, the communication interface 504, the memory 506 or the like, for requesting one or more physical beam channels from one or more donor nodes. In some embodiments, the repeater node 703 may request a maximum number of physical beam channels from the one or more donor nodes. The maximum number of physical beam channels may be based at least in part on a maximum number of physical repeater beam channels, which a repeater node may support. In some embodiments, the maximum number of physical beam channels may also be based at least in part on a number of detected donor nodes. For example, if a repeater node 703 has a maximum of 8 physical repeater beam channels, it may request a maximum of 7 physical beam channels from each donor node. The repeater node 703 may request physical beam channels from each donor node to match its maximum of number of physical repeater beam channels. As such, the repeater node 703 may diversify the number of donor nodes with which it is in communication, thereby advantageously allowing for the repeater node to have a fallback donor node in an instance a currently serving donor node experiences a link failure.

At block 1404, the apparatus 500 embodied by a network entity, such as repeater node 703, may include means, such as the processing circuitry 502, the communication interface 504, the memory 506 or the like, for receiving an indication of resource information from the one or more donor nodes. In some embodiments, the indication of resource information received from a particular donor node may include a count of synchronization signal block resources, a count of random access channel occasions, physical downlink control channel configuration information, channel state information reference signal configuration information, or physical random access channel configuration information for respective donor nodes. In some embodiments, the indication of resource information may include an indication of physical beam channel scheduling as resolved by two or more donor nodes. The two or more donor nodes may include the indication of physical beam scheduling after communication has occurred between the two or more donor nodes to ensure no overlap in frequency and time occurs between the allocated physical beam channels.

At block 1405, the apparatus 500 embodied by a network entity, such as repeater node 703, may include means, such as the processing circuitry 502, the memory 506 or the like, for determining whether a conflict exists between the one or more donor nodes. In some embodiments, a repeater node 703 may determine a conflict exists in an instance the physical beam channels as allocated by the one or more donor nodes overlap in time and frequency. In an instance the repeater node 703 determines a conflict exists between two or more donor nodes, the repeater node may use the control and resource allocation and conflict resolution channel to renegotiate with the two or more donor nodes to resolve the conflict.

At block 1406, the apparatus 500 embodied by a network entity, such as repeater node 703, may include means, such as the processing circuitry 502, the memory 506 or the like, for determining a grid of physical repeater beam channels. The repeater node 703 may determine the grid of physical repeater beam channels. The grid of physical repeater beam channels may include one or more physical repeater beam channels. Each physical repeater beam channel may be associated with a particular physical beam channel from a particular donor node. Additionally, each physical beam channel may be associated with one or more configuration parameters. The one or more configuration parameters may be indicative of a time slot for a physical repeater beam channel and a spatial direction for the physical repeater beam channel. The spatial direction for the physical repeater beam channel may cover at least a portion of the access area associated with the repeater node 703.

In some embodiments, the repeater node 703 may map the associated physical beam channel from a donor node to a particular physical repeater beam channel. Additionally, each RO may be mapped to a particular donor node such that the repeater node 603 is aware of the corresponding donor node to which to provide the UE signal. The grid of physical repeater beam channels may include one or more configuration parameters for each physical repeater beam channel. The one or more configuration parameters may be indicative of a physical beam channel to which the physical repeater beam channel corresponds, an indication of a corresponding donor node associated with the physical beam channel to which the physical repeater beam channel corresponds, a time slot corresponding to the physical repeater beam channel, and/or the like.

Furthermore, the repeater node 703 may include a repeater schedule with one or more time slots. In an example embodiment, the repeater schedule may be determined based at least in part on whether the one or more control channels are configured to use TDM, FDM, or SDM. The repeater schedule may include one or more time slots. The repeater node 703 may assign one or more physical repeater beam channels to one or more time slots. The repeater node 703 may additionally assign one or more physical beam channels, one or more backhaul physical beam channels, and/or one or more ROs one or more time slots in the repeater schedule. During a particular time slot, the assigned channel may perform signaling operations (e.g., transmission or receiving).

The repeater schedule may define a direction in which one or more backhaul panel transmitters and/or receivers spatially point for a given time slot. In some embodiments, the one or more guard intervals may be used when the one or more control channels are configured to multiplex traffic according to TDM. For example, in one time slot, a backhaul panel may be spatially positioned such that it may receive physical beam channels from donor node A and/or transmit backhaul physical beam channels from donor node A. As another example, in a different time slot, a backhaul panel may be spatially positioned such that it may receive physical beam channels from donor node B and/or transmit backhaul physical beam channels from donor node B. In some embodiments, the repeater schedule may include one or more guard intervals. The guard intervals may allow for consideration of switching delays, propagation delay constraints due to the distance between donor nodes, and/or any RF hardware limitations. In some embodiments, a switching delay may consider the time required between switching between two or more operational pattern configurations (e.g., between an uplink operational configuration and a downlink operational configuration) or switching between communication from one donor node to another (e.g., switching communication between donor node A 701 and donor node B 702).

In some embodiments, the repeater schedule may also define an operational pattern configuration within which an access panel and backhaul panel operates for a given time. The operational pattern configuration may include an uplink operational pattern configuration and downlink operational pattern configuration. For example, in one time slot, the repeater schedule may indicate the access panel and backhaul panel operates in an uplink operational pattern configuration such that only signals corresponding to an uplink pattern are received and/or transmitted. As another example, in another time slot, the repeater schedule may indicate the access panel and backhaul panel operates in a downlink operational pattern configuration such that only signals corresponding to a downlink pattern are received and/or transmitted. In some embodiments, the repeater schedule may be based at least in part on the configuration parameters for the physical repeater beam channels. As such, the repeater schedule may accommodate the reception of signals from UEs and/or donor nodes and/or the provision of signals to the one or more donor nodes. The repeater node may provide the repeater beam scheduling to one or more donor nodes. In some embodiments, an indication of the repeater beam signaling is provided in the configuration parameters. Signals received by the repeater node which do not correspond to the operational pattern configuration defined by the current time slot may be ignored by the repeater node.

In some embodiments, the repeater schedule may also define a non-overlapping frequency band configuration for each time slot. For example, each time slot may be assigned a particular frequency range within which the signals may be received and/or transmitted. Signals received by the repeater node 703 which are outside of the frequency range may be ignored by the repeater node 703.

When the one or more control channels are configured to multiplex traffic according to TDM, for example, the repeater node 703 may assign each physical repeater beam channel a unique time slot in the repeater schedule. As such, no two physical repeater beam channels may be transmitted at the same time. Additionally, a particular time slot may correspond to a particular entity and/or operational pattern configuration. For example, a time slot may be defined such that a backhaul access panel is pointed to a particular donor node and may be configured to receive physical beam channels from and/or provide backhaul physical beam channels to the donor node during the time slot. As another example, a time slot may be defined such that a backhaul access panel is pointed to a particular donor node and assigned an uplink operational pattern configuration such that the repeater node may be configured to provide a backhaul physical beam channel to the donor node during the time slot. In some embodiments, when the one or more control channels are configured to multiplex traffic according to TDM, the assigned time slot for each physical repeater beam channel is based at least in part on traffic needs or quality of service requirements for one or more user devices within the access area.

In another example, when the one or more control channels are configured to multiplex traffic according to SDM, the repeater node 703 may assign one or more physical repeater beam channels a unique time slot in the repeater schedule. For example, a time slot may define all physical repeater beam channels such that all physical repeater beam channels are provided simultaneously. In some embodiments, if a time slot includes one or more physical repeater beam channels, the repeater node 703 may assign the physical repeater beam channels within the same time slot such that the two or more physical repeater beam channels are spatially non-adjacent physical repeater beam channels. As such, this may prevent beam interference that could occur between two adjacent physical repeater beam channels. For example, referring back to FIG. 6, a repeater node would ensure physical repeater beam channel 604y and physical repeater beam channel 604p are preferably not not placed in the same time slot as these two physical beam channels are spatially adjacent.

At block 1407, the apparatus 500 embodied by a network entity, such as repeater node 703, may include means, such as the processing circuitry 502, the communication interface 504, the memory 506 or the like, for providing each donor node with an indication of the grid of physical repeater beam channels. The repeater node 703 may use the control and resource allocation and conflict resolution for each channel to provide the respective donor node of the indication of the grid of physical repeater beam channels. In some embodiments, the repeater node 703 may additionally provide the repeater schedule to the one or more donor nodes. In some embodiments, the indication of the grid of physical repeater beam channels may include only the physical repeater beam channels corresponding to the donor node. In some embodiments, the indication of the grid of physical repeater beam channels may include one or more physical repeater beam channels corresponding to one or more additional donor nodes associated with the repeater node. As such, the donor node may be informed of physical repeater beam channels corresponding to one or more other donor nodes. This may allow the donor node to determine its own physical beam channel scheduling such that it does not interfere with the one or more physical repeater donor nodes.

At block 1408, the apparatus 500 embodied by a network entity, such as repeater node 703, may include means, such as the processing circuitry 502, the memory 506 or the like, for updating the grid of physical repeater beam channels. In some embodiments, the repeater node 703 may determine to update the grid of physical repeater beam channels in response to an update event. In some embodiments, an update event may occur in an instance one or more donor nodes experience a radio link failure or the repeater node 703 is no longer associated with the associated donor node access area for the associated donor node, such as when the repeater node 703 is mobile. As such, the repeater node 703 may update the grid of physical repeater beam channels based at least in part on the one or more remaining physical beam channels from the remaining donor nodes. The corresponding physical repeater beam channels may be redefined such that the access area for the repeater node is still covered using the physical repeater beam channels corresponding to the remaining physical beam channel of the one or more remaining donor nodes. In some embodiments, the repeater node 703 may request additional physical repeater nodes from the one or more remaining donor nodes. In some embodiments, the request for additional physical repeater nodes may include a maximum number of requested physical beam channels.

Referring now to FIG. 15, an example flowchart 1500 is depicted that is implemented, for example, by an apparatus 1500 embodied by a network entity, such as donor node A 701 and/or donor node B 702.

At block 1501, the apparatus 500 embodied by a network entity, such as donor node A 701 and/or donor node B 702, may include means, such as the processing circuitry 502, the communication interface 504, the memory 506 or the like, for establishing a control channels with a repeater node. Once the repeater node 702 has detected one or more donor nodes, the repeater node 702 may establish a control channel with each detected donor node with sufficient signal strength. In some embodiments, the control channel is a control and resource allocation and conflict resolution channel. During establishment of the control channel with the repeater node, the control channel may also be configured to operation in TDM, FDM, or SDM. The mode with which the control channel is configured to operate may be based at least in part on the hardware specification (e.g., the backhaul panel and/or access panel) of the repeater node. In some embodiments, the donor node may also receive an indication of the signal repetition capability or beamforming capability from the repeater node.

At block 1502, the apparatus 500 embodied by a network entity, such as donor node A 701 and/or donor node B 702, may include means, such as the processing circuitry 502, the communication interface 504, the memory 506 or the like, for providing an indication of operation status to the repeater node. The indication of operation status includes, for example, at least one of an indication of loading status, radio link failure, channel quality, required UE transmit power, or timing advance information. The donor node may provide an indication of operation status to the repeater node periodically and/or in an instance an update event occurs. An update event may include a radio link failure for the donor node or a radio link failure for an upstream donor node with which the donor node is associated.

At block 1503, the apparatus 500 embodied by a network entity, such as donor node A 701 and/or donor node B 702, may include means, such as the processing circuitry 502, the communication interface 504, the memory 506 or the like, for providing an indication of resource information to the repeater node. The donor node may determine a maximum number of physical beam channels it may allocate to the repeater node. The donor node may then provide an indication of resource information to the repeater node indicating the maximum number of physical beam channels it may allocate.

At block 1504, the apparatus 500 embodied by a network entity such as donor node A 701 and/or donor node B 702, may include means, such as the processing circuitry 502, the communication interface 504, the memory 506 or the like, for negotiating with the repeater node to allocate a number of physical beam channels to the repeater node. The indication of the maximum number of physical beam channels may be provided to the repeater node in an indication of resource information. The repeater node may negotiate back and forth with the donor node until a satisfactory number of physical beam channels are allocated and no overlap in frequency and time is detected with one or more additional donor nodes.

At block 1505, the apparatus 500 embodied by a network entity, such as donor node A 701 and/or donor node B 702, may include means, such as the processing circuitry 502, the communication interface 504, the memory 506 or the like, for allocating one or more physical beam channels to dedicate to the repeater node. The physical beam channels allocated to the repeater node may no longer be used to serve the UEs within the access area of the repeater and instead are used by the repeater node.

At block 1506, the apparatus 500 embodied by a network entity, such as donor node A 701 and/or donor node B 702, may include means, such as the processing circuitry 502, the communication interface 504, the memory 506 or the like, for receiving an indication of a grid of physical repeater beam channels from the repeater node. The indication of a grid of physical repeater beam channels may include one or more configuration parameters such that the donor node is aware of when to transmit one or more physical beam channels. In some embodiments, the donor node may additionally receive a repeater schedule from the repeater node. The donor node may follow the operations and rules as defined by the repeater schedule.

Referring now to FIG. 16, an example flowchart 1600 is illustrated that is implemented, for example, by an apparatus 1600 embodied by a network entity, such as donor node A 701 and/or donor node B 702.

At block 1601, the apparatus 500 embodied by a network entity such as donor node A 701 and/or donor node B 702, may include means, such as the processing circuitry 502, the communication interface 504, the memory 506 or the like, for establishing one or more communication channels with one or more apparatuses associated with the repeater node. In some embodiments, the donor node may be made aware of one or more other donor nodes connected to the same repeater node. As such, the donor node may establish a communication channel with one or more other donor nodes. In one example embodiment, the communication channel may use Xn signaling. In some embodiments, the repeater node may inform the donor node of one or more additional repeater nodes, such as during the provision of the grid of physical repeater beam channels.

At block 1602, the apparatus 500 embodied by a network entity such as donor node A 701 and/or donor node B 702, may include means, such as the processing circuitry 502, the memory 506 or the like, for determining resource allocation based at least in part on an indication of resource allocation availability from one or more other apparatuses. In some embodiments, the donor node may communicate with the one or more other donor nodes to determine an allocation of physical beam channels which do not conflict in frequency and time with one or more physical beam channels allocated by the one or more other donor nodes.

At block 1603, the apparatus 500 embodied by a network entity such as donor node A 701 and/or donor node B 702, may include means, such as the processing circuitry 502, the communication interface 504, the memory 506 or the like, for providing an indication of resource information to the repeater node. Once the donor node has determined an acceptable allocation of physical beam channels which do not conflict with one or more physical beam channels of the other donor nodes, the donor node may provide the repeater node with the indication of resource information. The indication of resource information may include the allocated physical beam channels as well as an indication that these physical beam channels do not interfere with one or more other physical beam channels from one or more other donor nodes.

It may be advantageous for a repeater node 703 to support a plurality of donor nodes, such as donor node A 701 and donor node B 702. The repeater node may pool the dedicated time-frequency resources from each donor node 701 and 702 to serve the UEs within an access area of the repeater node 703. The use of a plurality of donor nodes may alleviate the reliance of the repeater node on a single donor node to supply the required physical beam channels, and thus, each donor node 701 and 702 may better conserve its resources and maintain performance and efficiency. Furthermore, the pool of donor nodes 701 and 702 which serves the repeater node 703 may also be dynamically adjusted in response to a need for user traffic load balancing, donor node link failure, repeater node mobility, and/or the like.

FIGS. 7-12 and 14-16 illustrate message flows and flow charts depicting methods according to an example embodiment of the present invention. It will be understood that each block of the message flows may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 506 of an apparatus 500 employing an embodiment of the present invention and executed by a processing circuitry 502. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although the foregoing descriptions and the associated drawings describe certain example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although a few variations have been described in detail above, other modifications or additions are possible. For example, although described above in terms of signal strength, other parameters may be considered in relation to the selection of donor nodes in addition to or instead of signal strength, such as signal to noise ratio of the signals transmitted to or from the donor nodes. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes certain example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, messaging protocols and message formats than those described above in the context of the illustrative embodiments. These and numerous other alternative embodiments within the scope of the appended claims will be readily apparent to those skilled in the art.

That which is claimed is:

1. An apparatus comprising:
   processing circuitry; and
   at least one memory including computer program code,
   the at least one memory and the computer program code configured to, with the processing circuitry, cause the apparatus at least to:
   detect a plurality of donor nodes;
   establish a control channel with respective ones of the plurality of donor nodes including first and second donor nodes, wherein the control channel is configured to allow for allocation of a plurality of physical repeater beam channels between the apparatus and the plurality of donor nodes, wherein the control channel is established with the first donor node, while the control channel is also established with the second donor node and prior to experiencing a link failure with the first donor node;
   receive an indication of resource information from the plurality of donor nodes via the corresponding control channel; and
   determine a grid of a plurality of physical repeater beam channels to cover an access area based at least in part on the received indication of resource information from the plurality of donor nodes, wherein (i) respective ones of the plurality of physical repeater beam channels are associated with a physical beam channel from a particular donor node of the plurality of donor nodes and (ii) a respective physical repeater beam channel is associated with one or more configuration parameters, and (iii) the respective physical repeater beam channel covers at least a portion of the access area.

2. The apparatus of claim 1, wherein the at least one memory and the computer program code are further configured to, with the processing circuitry, cause the apparatus at least to:
   provide the plurality of donor nodes with an indication of the grid of the plurality of physical repeater beam channels, wherein the indication of the grid of the plurality of physical repeater beam channels includes at least the one or more configuration parameters associated with respective ones of the plurality of physical repeater beam channels which correspond to the particular donor node of the plurality of donor nodes.

3. The apparatus of claim 1, wherein the at least one memory and the computer program code are further configured to, with the processing circuitry, cause the apparatus at least to:
   determine whether a conflict exists between the plurality of donor nodes based at least in part on the received indication of resource information from the plurality of donor nodes, wherein a conflict occurs in an instance the resource information received from the plurality of donor nodes indicates an overlap in time and frequency of the plurality of donor nodes; and
   in an instance the resource information received from the plurality of donor nodes overlaps in time and frequency, use the one or more control channels for one or more donor nodes associated with the conflict to resolve the conflict.

4. The apparatus of claim 1, wherein the indication of resource information includes at least a count of synchronization signal block resources, a count of random access channel occasions, physical downlink control channel configuration information, channel state information reference signal configuration information, or physical random access channel configuration information for the plurality of donor nodes.

5. The apparatus of claim 1, wherein a respective control channel is configured to multiplex user device traffic using time division multiplexing, frequency division multiplexing, or spatial division multiplexing.

6. The apparatus of claim 1, wherein the at least one memory and the computer program code are further configured to, cause the apparatus at least to:
   determine a repeater schedule, wherein the repeater schedule includes one or more time slots;
   assign one or more physical repeater beam channels a time slot in the repeater schedule, wherein during the time slot, the physical repeater beam channel is able to be used to provide one or more signals to one or more user devices within the portion of the access area corresponding to the physical repeater beam channel; and
   provide the plurality of donor nodes with an indication of the repeater schedule.

7. The apparatus of claim 6, wherein the respective physical repeater beam channel is assigned a unique time slot within the repeater schedule.

8. The apparatus of claim 6, wherein:
   in an instance a time slot includes two or more physical repeater beam channels, the two or more physical repeater beam channels are spatially non-adjacent physical repeater beam channels.

9. The apparatus of claim 6, wherein the respective physical repeater beam channel is assigned a time slot based at least in part on traffic needs or quality of service requirements for one or more user devices within the access area.

10. The apparatus of claim 6, wherein one or more time slots include a guard interval, and wherein during a guard interval time slot, no signaling is received or transmitted by the apparatus.

11. The apparatus of claim 6, wherein the at least one memory and the computer program code are further configured to, with the processing circuitry, cause the apparatus at least to:
- assign a respective time slot an operational pattern configuration; and
- enforce signals received from or transmitted to the plurality of donor nodes based at least in part on the operational pattern configuration for the corresponding time slot.

12. The apparatus of claim 6, wherein the at least one memory and the computer program code are further configured to, with the processing circuitry, cause the apparatus at least to:
- assign a respective time slot one or more non-overlapping frequency band configurations; and
- enforce signals received from or transmitted to the plurality of donor nodes based at least in part on the non-overlapping frequency band configuration for the corresponding time slot.

13. The apparatus of claim 1, wherein the at least one memory and the computer program code are further configured to, with the processing circuitry, cause the apparatus at least to:
- in an instance a donor node of the plurality of donor nodes experiences an update event, update the grid of the plurality of physical repeater beam channels.

14. The apparatus of claim 13, wherein the update event occurs in an instance the plurality of donor nodes experience a radio link failure or the apparatus is no longer within an associated donor access area for the plurality of donor nodes.

15. The apparatus of claim 1, wherein the at least one memory and the computer program code are further configured to, with the processing circuitry, cause the apparatus at least to:
- update the grid of the plurality of physical repeater beam channels based at least in part on user device traffic load for respective ones of the plurality of donor nodes.

16. The apparatus of claim 1, wherein the at least one memory and the computer program code are further configured to, with the processing circuitry, cause the apparatus at least to:
- detect the plurality of donor nodes using a backhaul beam sweep or synchronization signal block search operation, wherein the plurality of donor nodes which are detected are associated with a signal strength which satisfies one or more signal strength thresholds.

17. The apparatus of claim 1, wherein the at least one memory and the computer program code are further configured to, with the processing circuitry, cause the apparatus at least to:
- provide a request for the indication of resource information to the plurality of donor nodes using the corresponding control channel, wherein the request for the indication of resource information includes a requested number of physical beam channels from the corresponding plurality of donor nodes.

18. The apparatus of claim 1, wherein the at least one memory and the computer program code are further configured to, with the processing circuitry, cause the apparatus at least to:
- provide an indication of the signal repetition capability or beamforming capability of the apparatus to the plurality of donor nodes.

19. The apparatus of claim 1, wherein the control channel is established via the apparatus which is configured to communicate with the plurality of donor nodes and one or more user equipment (UE) simultaneously.

20. An apparatus comprising:
- processing circuitry; and
- at least one memory including computer program code,
- the at least one memory and the computer program code configured to, with the processing circuitry, cause the apparatus at least to:
  - establish a first control channel with a repeater node, wherein the first control channel is configured to allow for allocation of a plurality of physical repeater beam channels between the repeater node and a plurality of donor nodes;
  - establish a second control channel with one or more of the plurality of donor nodes to coordinate resource usage of the repeater node;
  - allocate one or more physical beam channels to dedicate to the repeater node;
  - provide an indication of resource information to the repeater node; and
  - receive an indication of a grid of a plurality of physical repeater beam channels from the repeater node, wherein (i) a respective physical repeater beam channel is associated with a physical beam channel from a particular donor node of the plurality of donor nodes and (ii) the indication of the grid of the plurality of physical repeater beam channels includes at least one or more configuration parameters associated with one or more physical repeater beam channels which correspond to the apparatus.

21. The apparatus of claim 20, wherein the at least one memory and the computer program code are further configured to, with the processing circuitry, cause the apparatus at least to:
- determine resource allocation based at least in part on an indication of resource allocation availability from the one or more of the plurality of donor nodes.

22. The apparatus of claim 20, wherein the at least one memory and the computer program code are further configured to, with the processing circuitry, cause the apparatus at least to:
- provide an indication of operation status to the repeater node, wherein the indication of operation status includes at least one of an indication of loading status, radio link failure, channel quality, required UE transmit power, or timing advance information.

23. The apparatus of claim 20, wherein the at least one memory and the computer program code are further configured to, with the processing circuitry, cause the apparatus at least to:
- negotiate with the repeater node to, at least, allocate a maximum number of physical beam channels to the repeater node.

* * * * *